United States Patent
Shinohara et al.

(10) Patent No.: US 9,509,435 B2
(45) Date of Patent: Nov. 29, 2016

(54) DETERMINATION DEVICE AND DETERMINATION METHOD

(71) Applicant: FUJITSU LIMITED, Kawasaki-shi, Kanagawa (JP)

(72) Inventors: Haruka Shinohara, Kawasaki (JP); Kiyotoshi Noheji, Kawasaki (JP); Takuya Miyashita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 117 days.

(21) Appl. No.: 14/100,140

(22) Filed: Dec. 9, 2013

(65) Prior Publication Data

US 2014/0199061 A1 Jul. 17, 2014

(30) Foreign Application Priority Data

Jan. 17, 2013 (JP) .................................. 2013-006313

(51) Int. Cl.
*H04J 14/02* (2006.01)
*H04B 10/038* (2013.01)
*H04Q 11/00* (2006.01)

(52) U.S. Cl.
CPC ......... *H04J 14/0268* (2013.01); *H04B 10/038* (2013.01); *H04J 14/0257* (2013.01); *H04J 14/0267* (2013.01); *H04J 14/0271* (2013.01);
(Continued)

(58) Field of Classification Search
CPC ......... H01J 14/0227; H01J 14/0241–14/0242; H01J 14/0257; H01J 14/0263; H01J 14/0278–14/0279; H01J 14/0284; H01J 14/0267–14/0271; H01J 14/0286; H04Q 2011/0069; H04Q 2011/0081; H04B 10/038; H04B 10/032
See application file for complete search history.

(56) References Cited

U.S. PATENT DOCUMENTS

2003/0117950 A1* 6/2003 Huang ................... H04L 45/00
                                                         370/220
2007/0036544 A1   2/2007 Fukashiro et al.
(Continued)

FOREIGN PATENT DOCUMENTS

JP    2006-211385    8/2006
JP    2007-36412     2/2007
(Continued)

OTHER PUBLICATIONS

Office Action issued by the Japanese Patent Office on Aug. 23, 2016 in corresponding Japanese patent application No. 2013-006313.

*Primary Examiner* — David Payne
*Assistant Examiner* — Casey Kretzer
(74) *Attorney, Agent, or Firm* — Staas & Halsey LLP

(57) ABSTRACT

A determination device for a wavelength division multiplex communication system, configured to set each of different paths each of which is formed by connection of spans each of which is a zone between two adjacent transmission devices, among transmission devices forming a communication network, in the communication network, or a single span in the communication network, for the corresponding one of different wavelengths, and configured to transmit an optical signal of each of the wavelengths via the corresponding path set to the wavelength, the device includes: a determination section configured to determine whether an optical signal of at least one of the wavelengths is transmittable only to a path, among newly formed paths, for which the number of spans forming the path is equal to or less than a predetermined upper-limit number, in order to transmit one or more optical signals of one or more wavelengths among the wavelengths.

8 Claims, 26 Drawing Sheets

(52) U.S. Cl.
CPC ... *H04J 14/0275* (2013.01); *H04Q 2011/0081* (2013.01)

(56) References Cited

U.S. PATENT DOCUMENTS

| | | | |
|---|---|---|---|
| 2007/0047958 A1* | 3/2007 | Gumaste | H04J 14/0204 398/69 |
| 2007/0127917 A1 | 6/2007 | Fujii | |
| 2009/0116833 A1 | 5/2009 | Shimizu et al. | |
| 2011/0026925 A1* | 2/2011 | Mu | H04J 14/0257 398/79 |
| 2011/0038253 A1 | 2/2011 | Yabusaki et al. | |
| 2011/0229134 A1* | 9/2011 | Takita | H04L 45/38 398/58 |
| 2012/0230680 A1* | 9/2012 | Fujita | H04B 10/0793 398/29 |
| 2012/0321296 A1* | 12/2012 | Wellbrock | H04B 10/038 398/5 |
| 2013/0010612 A1* | 1/2013 | Lee | H04L 45/62 370/248 |
| 2014/0023372 A1* | 1/2014 | Sambo | H04J 14/0224 398/79 |
| 2015/0016815 A1* | 1/2015 | Maggiari | H04J 14/0287 398/5 |
| 2015/0256253 A1* | 9/2015 | Bottari | H04J 14/0268 398/28 |

FOREIGN PATENT DOCUMENTS

| | | |
|---|---|---|
| JP | 2007-158727 | 6/2007 |
| JP | 2009-118101 | 5/2009 |
| JP | 2010-62647 | 3/2010 |
| JP | 2011-41103 | 2/2011 |

* cited by examiner

FIG. 3

| | WAVELENGTH #1 | WAVELENGTH #2 | WAVELENGTH #3 | WAVELENGTH #4 | WAVELENGTH #5 | WAVELENGTH #6 | WAVELENGTH #7 | WAVELENGTH #8 |
|---|---|---|---|---|---|---|---|---|
| SPAN a | 1 | 0 | 0 | 0 | 0 | 0 | 1 | 1 |
| SPAN b | 1 | 0 | 0 | 0 | 0 | 0 | 1 | 1 |
| SPAN c | 1 | 0 | 0 | 0 | 0 | 0 | 1 | 1 |
| SPAN d | 1 | 1 | 1 | 0 | 0 | 1 | 1 | 1 |
| SPAN e | 1 | 1 | 1 | 1 | 0 | 1 | 1 | 1 |
| SPAN f | 1 | 1 | 1 | 1 | 0 | 0 | 0 | 1 |

FIG. 4

| | SPAN NUMBER | SPANS OF TARGET PATH | | | | LOGICAL DISJUNCTION | | | | | | | | DETERMINATION |
|---|---|---|---|---|---|---|---|---|---|---|---|---|---|---|
| | | FIRST SPAN | SECOND SPAN | THIRD SPAN | FOURTH SPAN | WAVE-LENGTH #1 | WAVE-LENGTH #2 | WAVE-LENGTH #3 | WAVE-LENGTH #4 | WAVE-LENGTH #5 | WAVE-LENGTH #6 | WAVE-LENGTH #7 | WAVE-LENGTH #8 | |
| PATH #1 | 1 | a | | | | 1 | 0 | 0 | 0 | 0 | 0 | 1 | 1 | OK |
| PATH #2 | 2 | a | e | | | 1 | 1 | 1 | 0 | 0 | 1 | 1 | 1 | OK |
| PATH #3 | 2 | a | b | | | 1 | 0 | 0 | 0 | 0 | 0 | 1 | 1 | OK |
| PATH #4 | 3 | a | b | c | | 1 | 0 | 0 | 0 | 0 | 0 | 1 | 1 | OK |
| PATH #5 | 4 | a | b | c | d | 1 | 0 | 0 | 0 | 0 | 1 | 1 | 1 | OK |

FIG. 11

| MODULATION METHOD | UPPER LIMIT SPAN NUMBER |
|---|---|
| INTENSITY MODULATION METHOD | 10 |
| PHASE MODULATION METHOD | 4 |

FIG. 12

| WAVELENGTH | MODULATION METHOD |
|---|---|
| WAVELENGTH #1 | PHASE MODULATION METHOD |
| WAVELENGTH #2 | PHASE MODULATION METHOD |
| WAVELENGTH #3 | PHASE MODULATION METHOD |
| WAVELENGTH #4 | PHASE MODULATION METHOD |
| WAVELENGTH #5 | INTENSITY MODULATION METHOD |
| WAVELENGTH #6 | INTENSITY MODULATION METHOD |
| WAVELENGTH #7 | INTENSITY MODULATION METHOD |
| WAVELENGTH #8 | INTENSITY MODULATION METHOD |

FIG. 15

| MODULATION METHOD | GUARD BAND | UPPER LIMIT SPAN NUMBER |
|---|---|---|
| PHASE MODULATION METHOD | 1 | 1 |
| | 2 | 2 |
| | 3 | 3 |
| | 4 OR MORE | 4 |
| INTENSITY MODULATION METHOD | — | 10 |

FIG. 16

| SPAN | GUARD BAND |
|---|---|
| a | 5 |
| b | 5 |
| c | 5 |
| d | 4 |
| e | 2 |
| f | 3 |
| g | 5 |
| h | 5 |

FIG. 20

| MODULATION METHOD | FIBER TYPE | UPPER LIMIT SPAN NUMBER |
|---|---|---|
| PHASE MODULATION METHOD | SMF | 4 |
| | NZ-DSF | 2 |
| INTENSITY MODULATION METHOD | — | 10 |

FIG. 21

| SPAN | FIBER TYPE |
|---|---|
| a | SMF |
| b | NZ-DSF |
| c | SMF |
| d | SMF |
| e | SMF |
| f | SMF |
| g | SMF |
| h | SMF |

DETERMINATION DEVICE AND DETERMINATION METHOD

CROSS-REFERENCE TO RELATED APPLICATION

This application is based upon and claims the benefit of priority of the prior Japanese Patent Application No. 2013-006313, filed on Jan. 17, 2013, the entire contents of which are incorporated herein by reference.

FIELD

The embodiments discussed herein are related to a determination device and a determination method.

BACKGROUND

Optical wavelength division multiplex communication systems which perform optical wavelength division multiplex communication have been known (see, for example, Japanese Laid-open Patent Publication No. 2007-158727 and Japanese Laid-open Patent Publication No. 2006-211385). One of optical wavelength division multiplex communication systems of this type includes a plurality of transmission devices forming a communication network. Furthermore, the optical wavelength division multiplex communication system is configured to set each of the plurality of different paths for the corresponding one of the plurality of different wavelengths.

In this case, each path is formed by connection of spans each of which is a zone between adjacent two transmission devices in a communication network, or a single span in the communication network. Furthermore, the optical wavelength division multiplex communication system is configured to transmit an optical signal of each wavelength via a path set for the wavelength. The optical wavelength division multiplex communication system determines whether an optical signal of a wavelength may be newly transmitted.

Incidentally, in the above-described optical wavelength division multiplex communication system, when a span is newly used in order to transmit an optical signal of a wavelength, a newly usable wavelength (that is, an empty resource) varies in a path formed by the span. Therefore, if a span is newly used after a path is determined, it is preferable to determine whether the determined path still has a usable wavelength.

Also, when a span is newly used, the empty resource might vary in all of paths formed by the newly used span. However, when the above-described determination is performed on all of the paths formed by the newly used span, a load of processing for performing the above-described determination becomes too large. Accordingly, in this case, for example, processing (for example, path switching, and the like) on the basis of a determination result might be excessively delayed.

It is therefore an object of the present disclosure to provide a determination device which may solve the above-described problem in which "there are cases where a load of processing becomes too large".

SUMMARY

According to an aspect of the embodiment, a determination device for a wavelength division multiplex communication system, configured to set each of different paths each of which is formed by connection of spans each of which is a zone between two adjacent transmission devices, among transmission devices forming a communication network, in the communication network, or a single span in the communication network, for the corresponding one of different wavelengths, and configured to transmit an optical signal of each of the wavelengths via the corresponding path set to the wavelength, the device includes: a determination section configured to determine whether an optical signal of at least one of the wavelengths is transmittable only to a path, among newly formed paths, for which the number of spans forming the path is equal to or less than a predetermined upper-limit number, in order to transmit one or more optical signals of one or more wavelengths among the wavelengths.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is an example table illustrating per-span resource information according to the first embodiment;

FIG. 4 is an example table illustrating per-path resource information according to the first embodiment;

FIG. 11 is an example table in which information indicating modulation method and information indicating upper-limit span number are associated with each other according to the first modified example of the first embodiment;

FIG. 12 is an example table in which information indicating wavelength and information indicating modulation method are associated with each other according to the first modified example of the first embodiment;

FIG. 15 is an example table in which information indicating modulation method, information indicating guard band, and information indicating upper-limit span number are associated with one another according to the second modified example of the first embodiment;

FIG. 16 is an example table in which information indicating span and information indicating guard band are associated with one another according to the second modified example of the first embodiment;

FIG. 20 is an example table in which information indicating modulation method, information indicating fiber type, and information indicating upper-limit span number are associated with one another according to the third modified example of the first embodiment;

FIG. 21 is an example table in which information indicating span and information indicating fiber type are associated with one another according to the third modified example of the first embodiment;

DESCRIPTION OF EMBODIMENTS

In order to solve at least one of the above-described problems, embodiments of a determination device, a determination method, and a determination program according to the present disclosure will be hereinafter described with reference to FIGS. 1-26.

An optical wavelength division multiplex communication system according to a first embodiment is configured to set each of a plurality of different paths for the corresponding one of a plurality of different wavelengths. Furthermore, the optical wavelength division multiplex communication system is configured to transmit an optical signal of each wavelength via a path set for the wavelength. In addition, because the optical wavelength division multiplex communication system transmits an optical signal of a wavelength, among the plurality of wavelengths, when a span is newly used, the optical wavelength division multiplex communication system executes resource confirmation processing. Herein, the term "span" represents a zone (a transmission path) between adjacent two transmission devices in a communication network formed by a plurality of transmission devices.

Resource confirmation processing is processing of determining whether an optical signal of at least one wavelength may be newly transmitted only to a path, among paths formed by a newly used span, whose span number is equal to or less than a predetermined upper-limit span number. Herein, the term "span number" represents the number of spans forming a single path.

Thus, by limiting a path which is to be a target of the above-described determination, an undesirable increase in load of processing for performing the above-described determination may be avoided. That is, the load of processing may be reduced.

The optical wavelength division multiplex communication system according to the first embodiment will be hereinafter described in detail.

Configuration

Figure 1:
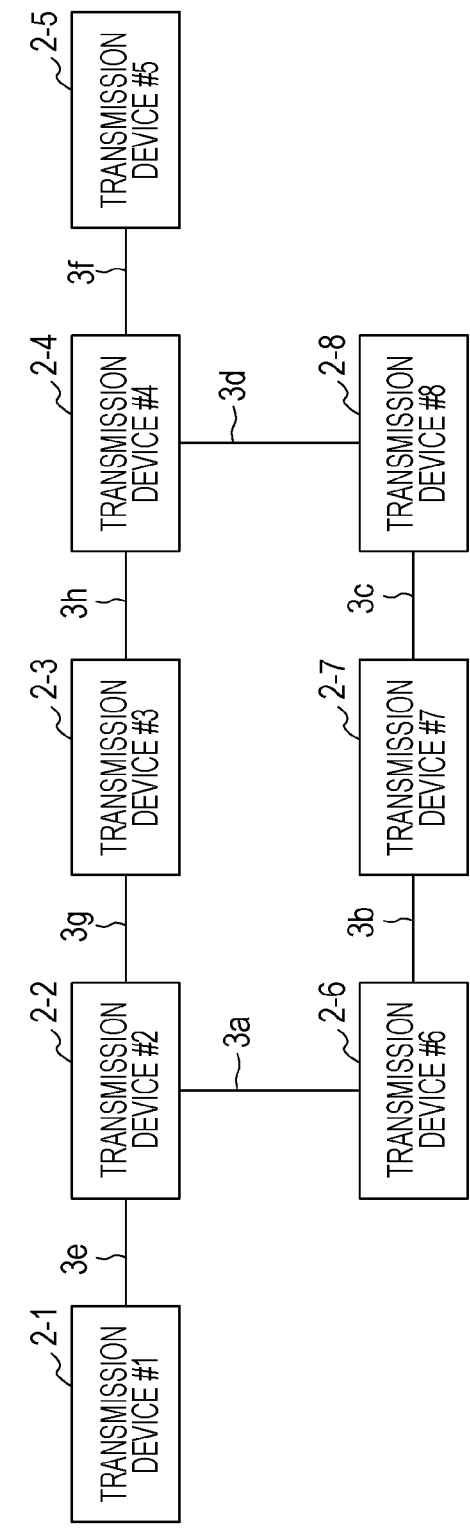
FIG. 1 is a diagram illustrating a configuration of an example optical wavelength division multiplex communication system according to a first embodiment.

As illustrated in FIG. 1, an optical wavelength division multiplex communication system 1 according to the first embodiment includes a plurality of transmission devices (eight transmission devices in this example) (nodes) 2-*i* (where i is a natural number of 1 to 8). Note that the number of the plurality of transmission devices included in the optical wavelength division multiplex communication system 1 may be a plural number other than 8. Note that the transmission devices 2-*i* will be hereinafter also referred to as "transmission devices #i". When being described without specifying an individual one or ones of the transmission devices 2-*i*, the transmission devices 2-*i* are also referred to as merely "transmission devices 2".

The optical wavelength division multiplex communication system 1 performs optical wavelength multiplex communication (optical wavelength division multiplex communication, wavelength division multiplex (WDM)). That is, the optical wavelength division multiplex communication system 1 is configured to set each of a plurality of different paths for the corresponding one of a plurality of different wavelengths (eight wavelengths in this case). Furthermore, the optical wavelength division multiplex communication system 1 is configured to transmit an optical signal of each wavelength via a path set for the wavelength. Note that the number of wavelengths which the optical wavelength division multiplex communication system 1 uses may be a number other than 8, that is, for example, 40, 88, or the like.

In this case, in a communication network formed by the plurality of transmission devices 2-*i*, a path is formed by connection of spans or a single span. A span is a zone between two adjacent transmission devices 2-*i* in the communication network.

The transmission device 2-2 and the transmission device 2-6 are connected to each other via an optical fiber 3*a*. The zone between the transmission device 2-2 and the transmission device 2-6 is also indicated by a span a. The transmission device 2-6 and the transmission device 2-7 are connected to each other via an optical fiber 3*b*. The zone between the transmission device 2-6 and the transmission device 2-7 is also indicated by a span b.

The transmission device 2-7 and the transmission device 2-8 are connected to each other via an optical fiber 3*c*. The zone between the transmission device 2-7 and the transmission device 2-8 is also indicated by a span c. The transmission device 2-8 and the transmission device 2-4 are connected to each other via an optical fiber 3*d*. The zone between the transmission device 2-8 and the transmission device 2-4 is also indicated by a span d.

The transmission device 2-1 and the transmission device 2-2 are connected to each other via an optical fiber 3e. The zone between the transmission device 2-1 and the transmission device 2-2 is also indicated by a span e. The transmission device 2-4 and the transmission device 2-5 are connected to each other via an optical fiber 3f. The zone between the transmission device 2-4 and the transmission device 2-5 is also indicated by a span f.

The transmission device 2-2 and the transmission device 2-3 are connected to each other via an optical fiber 3g. The zone between the transmission device 2-2 and the transmission device 2-3 is also indicated by a span g. The transmission device 2-3 and the transmission device 2-4 are connected to each other via an optical fiber 3h. The zone between the transmission device 2-3 and the transmission device 2-4 is also indicated by a span h.

In this example, each of the optical fibers 3a-3h is a single-mode fiber (SMF). Note that each of the optical fibers 3a-3h may be an optical fiber (for example, a dispersion shifted fiber (DSF), a non-zero dispersion shifted fiber (NZ-DSF), or the like) other than the SMF.

Next, the configuration of each of the transmission devices 2-i will be described.

Figure 2:
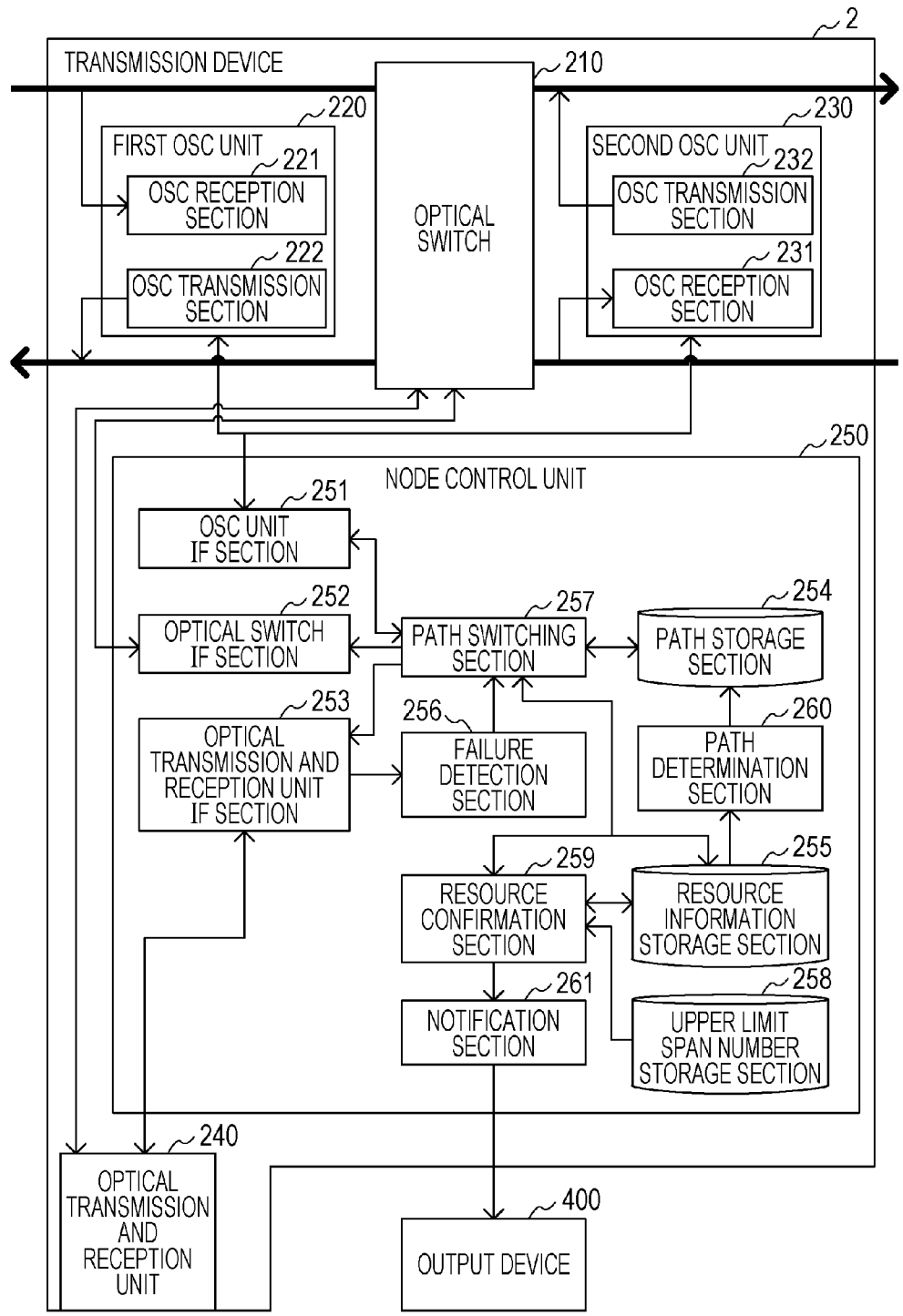
FIG. 2 is a diagram illustrating a configuration of an example transmission device according to the first embodiment.

As illustrated in FIG. 2, the transmission device 2 includes an optical switch 210, a first optical supervisory channel (OSC) unit 220, a second OSC unit 230, an optical transmission and reception unit 240, and a node control unit 250. Note that the node control unit 250 is an example of the determination device.

The optical switch 210 is an optical cross-connect switch. The optical switch 210 includes a plurality of ports. The optical switch 210 is configured to switch connection between ports for respective optical signals of the different wavelengths.

The first OSC unit 220 includes an OSC reception section 221 and an OSC transmission section 222.

The OSC reception section 221 bifurcates, from an optical signal received from a first adjacent node, a control signal (an OSC signal in this case) included in the optical signal and thereby receives the OSC signal from the first adjacent node. The OSC signal is a signal transmitted via a control channel (an OSC in this case). In this case, the OSC signal is a signal used for controlling each of the transmission devices 2-i.

In this case, the first adjacent node is one of transmission devices (adjacent nodes) adjacent to a self-device in the communication network.

The OSC signal received by the OSC reception section 221 is input to the node control unit 250 via an OSC unit IF section 251 which will be described later.

The OSC transmission section 222 inserts an OSC signal in an optical signal to be transmitted to the first adjacent node and thereby transmits the OSC signal to the first adjacent node.

The OSC signal to be transmitted by the OSC transmission section 222 is a signal output from the node control unit 250 via the OSC unit IF section 251 which will be described later.

The second OSC unit 230 includes an OSC reception section 231 and an OSC transmission section 232.

The OSC reception section 231 bifurcates, from an optical signal received from a second adjacent node, an OSC signal included in the optical signal and thereby receives the OSC signal from the second adjacent node. In this case, the second adjacent node is one of adjacent nodes, which is other than the first adjacent node. The OSC signal received by the OSC reception section 231 is input to the node control unit 250 via the OSC unit IF section 251 which will be described later.

The OSC transmission section 232 inserts an OSC signal in an optical signal to be transmitted to the second adjacent node and thereby transmits the OSC signal to the second adjacent node.

The OSC signal to be transmitted by the OSC transmission section 232 is a signal output from the node control unit 250 via the OSC unit IF section 251 which will be described later.

The optical transmission and reception unit 240 bifurcates, from an optical signal received from an adjacent node, a data signal including the self-device or a communication device (not illustrated) connected to the self-device as a destination and thereby receives the data signal. The data signal received by the optical transmission and reception unit 240 is input to the node control unit 250 via an optical transmission and reception unit IF section 253 which will be described later.

The optical transmission and reception unit 240 inserts the data signal generated by the self-device or the above-described communication device in an optical signal to be transmitted to an adjacent node and thereby transmits the data signal to the adjacent node.

The node control unit 250 includes an OSC unit interface (IF) section 251, an optical switch IF section 252, an optical transmission and reception unit IF section 253, a path storage section 254, a resource information storage section 255, a failure detection section (a failure detection part) 256, a path switching section (a path switching part) 257, an upper-limit span number storage section 258, a resource confirmation section (a determination part) 259, a path determination section 260, and a notification section (a notification part) 261.

The OSC unit IF section 251 is an interface used for controlling each of the first OSC unit 220 and the second OSC unit 230.

The optical switch IF section 252 is an interface used for controlling the optical switch 210.

The optical transmission and reception unit IF section 253 is an interface used for controlling the optical transmission and reception unit 240.

The path storage section 254 stores (information indicating) a current path and a spare path. The current path is a path actually used for transmitting an optical signal at a current time point. The spare path is a path which is not used for transmitting an optical signal at the current time point and is to be used instead of the current path when a failure occurs in any one of spans forming the current path.

Specifically, the path storage section 254 stores a current path and a spare path for the current path (that is, a path whose start point and end point match a start point and an end point of the current path) in association with each other. As will be described later, information stored in the path storage section 254 is updated, on the basis of information indicating the spare path determined by the path determination section 260, information indicating paths before and after switching performed by the path switching section 257, information indicated by a path switching instruction received from another node, and the like.

The resource information storage section 255 stores per-span resource information. In this example, as illustrated in FIG. 3, the per-span resource information includes information indicating a span and a use flag indicating whether each of the plurality of wavelengths is used by the span. In this example, the use flag indicates, when the value thereof is "1", that the wavelength is used and, on the other hand, when the value is "0", that the wavelength is not used.

The failure detection section 256 detects the occurrence of a failure in each span, on the basis of a data signal received by the optical transmission and reception unit 240. In this example, when the data signal is not received from an adjacent node during a waiting time which has been set in advance, the failure detection section 256 detects the occurrence of a failure in a span between the adjacent node and the self-device (the self-node). Note that the failure detection section 256 may be configured to detect the occurrence of a failure, on the basis of an error rate of the received data signal, and the like.

When the occurrence of a failure is detected by the failure detection section 256, the path switching section 257 obtains, among spare paths stored in the path storage section 254, a path for the current path formed by a span (a failure span) in which the occurrence of the failure has been detected. Specifically, the path switching section 257 obtains, among spare paths for the current path, a spare path formed by a span other than the failure span (that is, a spare path which does not include the failure span (bypasses the failure span).

The path switching section 257 stops use of the current path formed by the failure span and controls each of the transmission devices 2-$i$ so as to newly start use of the obtained spare path (that is, to switch a used path by starting use of the obtained spare path as a new current path).

Specifically, the path switching section 257 selects, on the basis of the per-span resource information stored in the resource information storage section 255, a wavelength which may be newly used in the obtained spare path. Furthermore, the path switching section 257 performs setting for transmitting an optical signal of the selected wavelength on each of the optical switch 210 and the optical transmission and reception unit 240 in the obtained spare path. In this example, setting for the optical switch 210 is setting for switching connection between ports of the optical switch 210. Also, setting for the optical transmission and reception unit 240 is setting for changing a wavelength to be a target of transmission and reception of the optical transmission and reception unit 240.

When the path switching section 257 switches a path, the path switching section 257 transmits the OSC signal including a path switching instruction which instructs switching of the path to an adjacent node. The path switching instruction includes information indicating a path and a wavelength before switching and a path and a wavelength after switching.

When switching a path, the path switching section 257 updates information indicating the current path and the spare path stores in the path storage section 254, on the basis of the information indicating a path and a wavelength before switching and a path and a wavelength after switching. Furthermore, when switching a path, the path switching section 257 updates the per-span resource information stored in the resource information storage section 255, on the basis of the information indicating a path and a wavelength before switching and a path and a wavelength after switching.

When the path switching section 257 receives the OSC signal including a path switching instruction from an adjacent node, the path switching section 257 performs setting on each of the optical switch 210 and the optical transmission and reception unit 240 in accordance with the path switching instruction. Furthermore, when the path switching section 257 receives the OSC signal including a path switching instruction from an adjacent node, the path switching section 257 updates, on the basis of the path switching instruction, information indicating the current path and the spare path stored in the path storage section 254. Thus, information indicating the current path and the spare path stored in each of the transmission devices 2-$i$ is synchronized between the transmission devices 2-$i$.

In addition, when the path switching section 257 receives the OSC signal including the path switching instruction from the adjacent node, the path switching section 257 updates, on the basis of the path switching instruction, the per-span resource information stored in the resource information storage section 255. Thus, the per-span resource information stored in each of the transmission devices 2-$i$ is synchronized between the transmission devices 2-$i$.

The upper-limit span number storage section 258 stores information indicating the upper-limit span number ("4" in this example) in advance.

Since the resource confirmation section 259 transmits an optical signal of a wavelength among the plurality of wavelengths, the resource confirmation section 259 executes, when a span is newly used, resource confirmation processing. In this example, when a used path is switched by the path switching section 257, the resource confirmation section 259 executes resource confirmation processing. Note that the resource confirmation section 259 may be configured to execute, even when use of a new path starts without switching a path, resource confirmation processing.

Resource confirmation processing is processing of determining whether an optical signal of at least one wavelength may be newly transmitted only to a path, among paths formed by a newly used span, whose span number is equal to or less than the upper-limit span number. The span number is the number of spans forming a path.

The resource confirmation section 259 performs the above-described resource confirmation processing (that is, the above-described determination) immediately after use of the above-described span is newly started. In this example, the resource confirmation section 259 performs resource confirmation processing immediately after switching of a path by the path switching section 257 is completed.

In this example, the resource confirmation section 259 executes resource confirmation processing, on the basis of the per-span resource information stored in the resource information storage section 255 and the upper-limit span number stored in the upper-limit span number storage section 258.

The resource confirmation section 259 causes the resource information storage section 255 to store per-path resource information indicating an execution result of resource confirmation processing. In this example, as illustrated in FIG. 4, the per-path resource information includes information indicating paths and information indicating whether there is a wavelength (a usable resource) which may be newly used in the paths (that is, whether each of the paths has a usable resource).

Specifically, the per-path resource information includes information in which information indicating paths and a usable-or-not-usable flag (a logical disjunction in this example) indicating whether each of the plurality of wavelengths is usable in the corresponding path are associated with each other. The usable-or-not-usable flag indicates, when the value thereof is "1", that the wavelength is not usable and, on the other hand, when the value thereof is "0", that the wavelength is usable. In other words, the per-path resource information is information indicating a result (a determination result) of determination on whether an optical signal of at least one wavelength may be newly transmitted in a path.

The path determination section 260 determines, on the basis of the per-path resource information stored in the resource information storage section 255, whether there is a spare path, among the spare paths stored in the path storage section 254, which does not have a usable resource. When there is a spare path, among the spare paths stored in the path storage section 254, which does not have a usable resource, the path determination section 260 determines an alternative path for the spare path. The alternative path is a path whose start point and end point match a start point and an end point of the spare path and which has a usable resource. Note that, in this example, the path determination section 260 is configured to determine a path having a span number equal to or less than the upper-limit span number as the alternative path.

The path determination section 260 updates information indicating a spare path, among the spare paths stored in the path storage section 254, which does not have a usable resource, to information indicating an alternative path determined for the spare path. Furthermore, the path determination section 260 transmits an OSC signal including a spare path change instruction which includes information indicating a spare path (that is, an alternative path) after update and information indicating a spare path before the update to an adjacent node.

When the path switching section 257 receives the OSC signal including the spare path change instruction from the adjacent node, the path switching section 257 updates, on the basis of the spare path change instruction, information indicating the spare paths stored in the path storage section 254. Thus, information indicating the spare paths stored in each of the transmission devices 2-$i$ is synchronized between the transmission devices 2-$i$.

When it is determined by the resource confirmation section 259 that none of optical signals of the plurality of wavelengths may be newly transmitted to at least one path (that is, at least one path does not have a usable resource), the notification section 261 outputs notification information to inform the above-described determination result to an output device 400.

The output device 400 includes a display device (for example, a display) and, when the notification information is input thereto, the output device 400 displays the notification information on the display device.

Operation

Next, the operation of the optical wavelength division multiplex communication system 1 will be described with reference to FIGS. 5-7.

Figure 7:
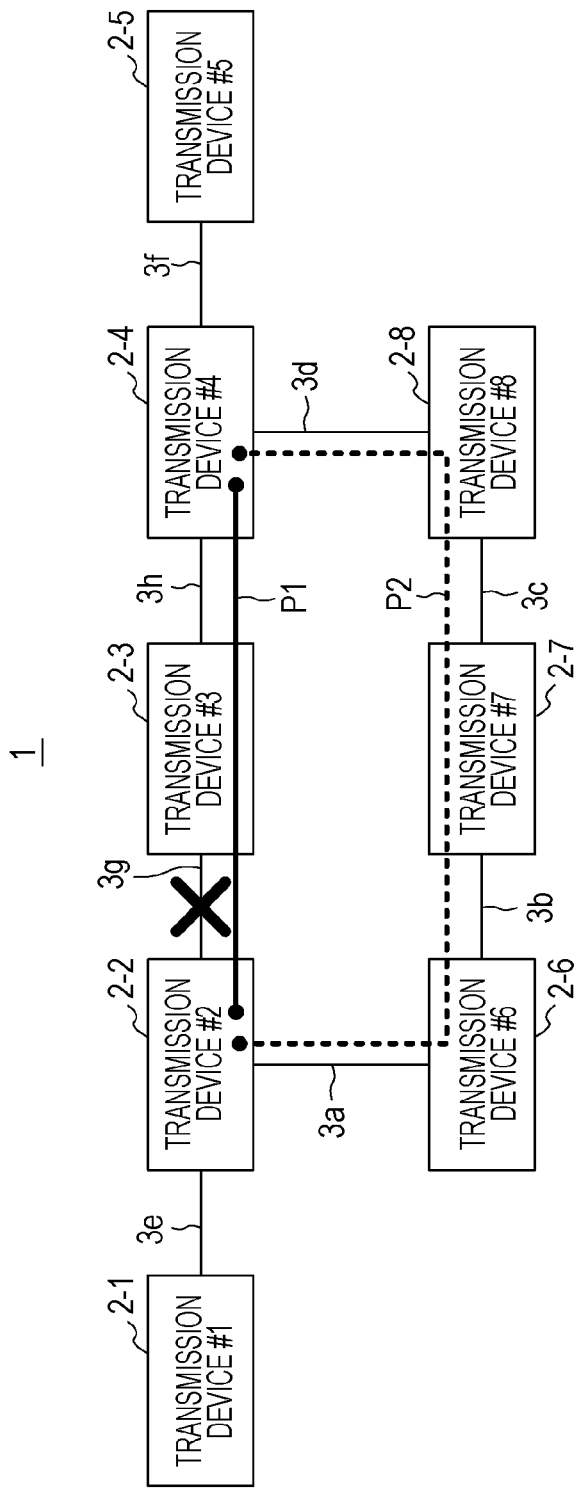
FIG. 7 is a diagram conceptually illustrating the operation of an example optical wavelength division multiplex communication system according to the first embodiment.

In this example, as illustrated in FIG. 7, it is assumed that, when a path P1 which is formed by connection of the span g and the span h and extends from the transmission device #2 to the transmission device #4 is used as a current path, a failure occurs in the span g, and thereafter, the transmission device #2 detects the occurrence of the failure.

Accordingly, with focus on the operation of the transmission device #2, the following description is given. Note that the other transmission devices 2-$i$ operate in the same manner as the transmission device #2.

Figure 5:
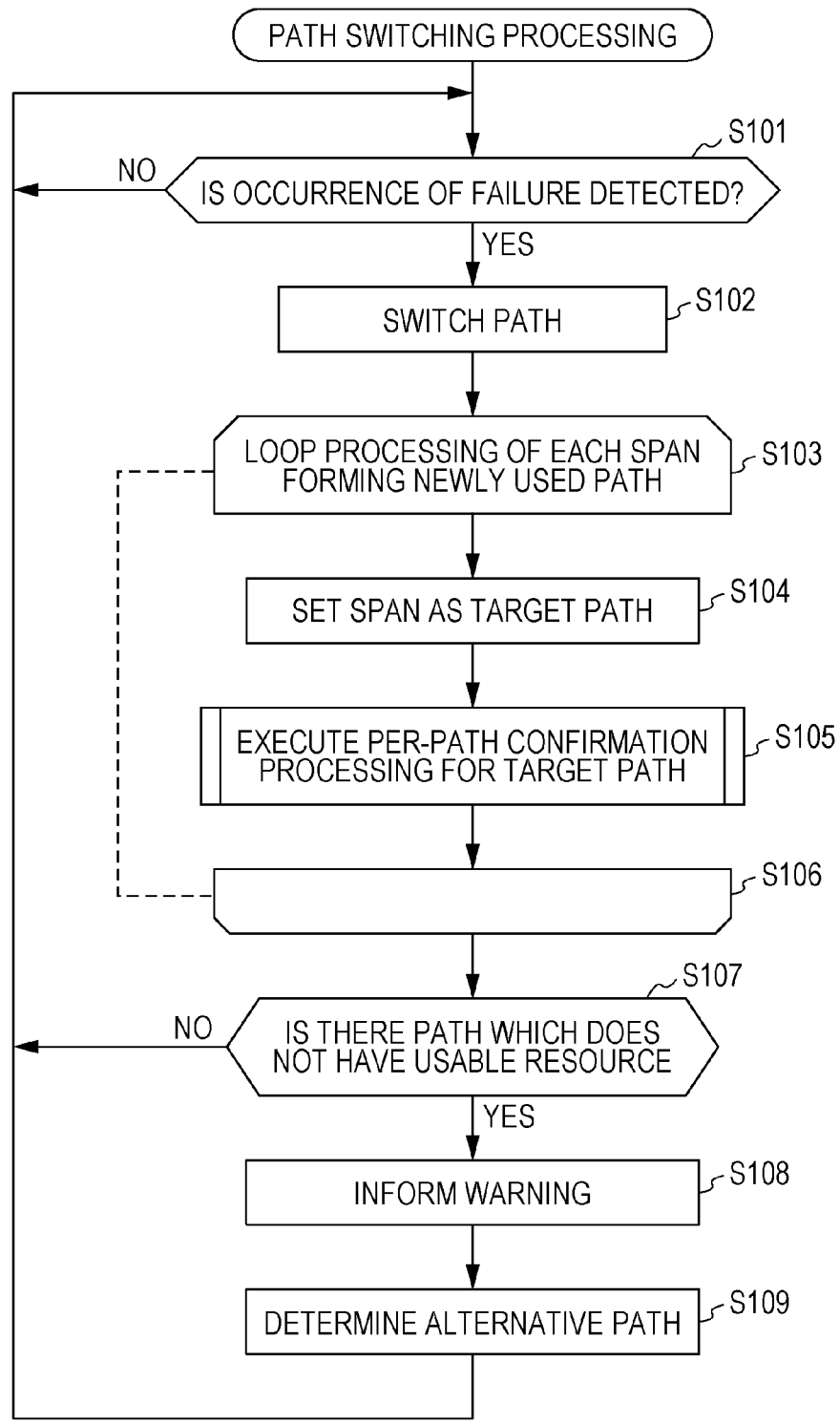
FIG. 5 is a flowchart illustrating per-path switching processing executed by the example transmission device according to the first embodiment.

The transmission device #2 is configured to execute path switching processing illustrated in the flowchart of FIG. 5. Specifically, the transmission device #2 waits until the occurrence of a failure in a span between an adjacent node and the self-device (the self-node) is detected (Step S101 in FIG. 5).

In accordance with the above-described assumption, the transmission device #2 detects the occurrence of a failure in the span g. Therefore, the transmission device #2 determines "YES", stops use of the current path P1 formed by the span g (a failure span), and controls each of the transmission devices 2-$i$ such that use of a spare path P2, among spare paths for the current path P1, which bypasses the failure span, is newly started. That is, the transmission device #2 switches the used path from the current path P1 to the spare path P2 (Step S102 in FIG. 5).

Specifically, the transmission device #2 selects, on the basis of the stored per-span resource information, a wavelength which may be newly used in the spare path P2. Furthermore, the transmission device #2 performs setting for transmitting an optical signal of the selected wavelength on each of the optical switch 210 and the optical transmission and reception unit 240 of the corresponding self-device. In addition, the transmission device #2 transmits an OSC signal including a path switching instruction to adjacent nodes (the transmission device #1 and the transmission device #6 in this example).

Furthermore, the transmission device #2 updates, on the basis of information indicating the path P1 before switching and the path P2 after switching, stored information indicating the current path and the spare paths. In addition, the transmission device #2 updates, on the basis of the information indicating the path P1 before switching and the path P2 after switching, the stored per-span resource information.

The transmission device #i which has received the path switching instruction transfers the path switching instruction to an adjacent node. Thus, each of the transmission devices #i receives the path switching instruction. In this example, each of the transmission devices #6, #7, #8, and #4 performs setting for transmitting an optical signal of the selected wavelength on each of the optical switch 210 and the optical transmission and reception unit 240 of the corresponding self-device in the spare path P2.

Furthermore, each of the transmission devices #i updates, on the basis of the information indicating the path P1 before switching and the path P2 after switching, the stored information indicating the current path and the spare paths. In addition, the transmission device #i updates, on the basis of the information indicating the path P1 before switching and the path P2 after switching, the stored per-span resource information.

Subsequently, the transmission device #2 executes first loop processing (Step S103-Step S106 in FIG. 5) in which each of spans forming the path (newly used path) P2 after switching is sequentially caused to be a processing target one by one. In this example, the transmission device #2 executes the first loop processing in which each of the span a, the span b, the span c, and the span d sequentially becomes a processing target.

In the first loop processing, first, the transmission device #2 sets as a target path a span to be a processing target (Step S104 in FIG. 5). In this example, the target path is a path including the span a at this time point. Subsequently, the transmission device #2 executes per-path confirmation processing illustrated in the flowchart of FIG. 6 on the target path set by Step S104 (Step S105 in FIG. 5).

Figure 6:
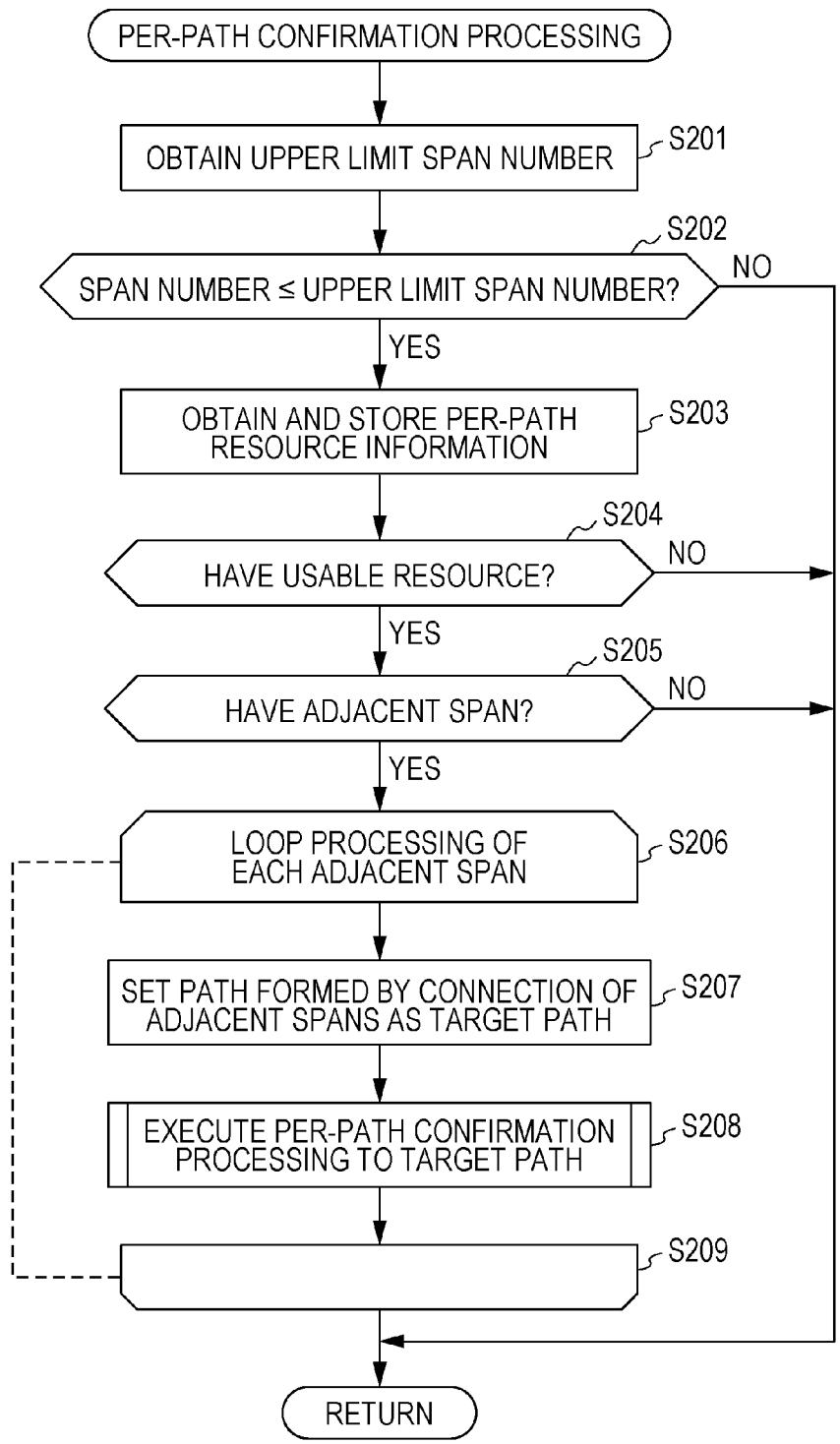
FIG. 6 is a flowchart illustrating per-path confirmation processing executed by the example transmission device according to the first embodiment.

Specifically, the transmission device #2 obtains the upper-limit span number (Step S201 in FIG. 6). In this example, the transmission device #2 obtains "4" as the upper-limit span number which has been stored in advance. Then, the transmission device #2 determines whether the span number of the target path is equal to or less than the obtained upper-limit span number (Step S202 in FIG. 6). In this example, the span number of the target path is "1" at this time point.

If the span number of the target path is more than the upper-limit span number, the transmission device #2 determines "NO" and the process proceeds to the next step (Step S106 in FIG. 5 or Step S209 in FIG. 6) following a step (a calling source) which is the basis for execution of per-path confirmation processing which is currently executed.

On the other hand, if the span number of the target path is equal to or less than the upper-limit span number, the transmission device #2 determines "YES", the process proceeds to Step S203 in FIG. 6. In this example, because the span number "1" is less than the upper-limit span number "4" at this time point, the transmission device #2 determines "YES" and the process proceeds to Step S203 in FIG. 6.

Subsequently, the transmission device #2 obtains per-path resource information, on the basis of the stored per-span resource information, and stores the obtained per-path resource information (Step S203 in FIG. 6).

Specifically, the transmission device #2 obtains (calculates), as a usable-or-not-usable flag, a logical disjunction of the use flag of each of spans forming the target path for each wavelength. The transmission device #2 obtains per-path resource information including information in which information indicating a path, the usable-or-not-usable flag, and information indicating a determination result are associated with one another. The information indicating a determination result indicates, when the value thereof is "OK", that at least one wavelength is usable and, on the other hand, when the value thereof is "NG", that none of the wavelengths is usable. In this example, it is an example of determination of whether an optical signal of at least one wavelength may be newly transmitted in a path to obtain the information indicating a determination result.

The transmission device #2 determines whether the target path has a usable resource (Step S204 in FIG. 6).

If the target path does not have a usable resource, the transmission device #2 determines "NO" and the process proceeds to the next step (Step S106 in FIG. 5 or Step S209 in FIG. 6) following the step which is the basis for execution of per-path confirmation processing which is currently executed.

On the other hand, if the target path has a usable resource, the transmission device #2 determines "YES", the process proceeds to Step S205 in FIG. 6. In this example, as illustrated in FIG. 3, a case where the span a has a usable wavelength is assumed. Therefore, at this time point, the transmission device #2 determines "YES", the process proceeds to Step S205 in FIG. 6.

The transmission device #2 determines whether the target path has an adjacent span (Step S205 in FIG. 6). In this case, the adjacent span is a span which is adjacent to a start point or an end point of the target path (that is, which may be connected to a span including a start point or an end point of the target path).

If the target path does not have an adjacent span, the transmission device #2 determines "NO" and the process proceeds to the next step following the step which is the basis for execution of per-path confirmation processing which is currently executed. On the other hand, if the target path has an adjacent span, the transmission device #2 determines "YES", the process proceeds to Step S206 in FIG. 6.

In this example, the target path (the span a) has adjacent spans (the span e and the span b). Therefore, the transmission device #2 determines "YES" and the process proceeds to Step S206 in FIG. 6.

The transmission device #2 executes second loop processing (Step S206-Step S209 in FIG. 6) in which each of adjacent spans is sequentially caused to be a processing target one by one. That is, in this example, the transmission device #2 executes second loop processing in which each of the span e and the span b sequentially becomes a processing target.

In the second loop processing, first, the transmission device #2 sets, as the target path, a path formed by connecting an adjacent span to be a processing target to the target path which has been set for per-path confirmation processing which is currently executed (Step S207 in FIG. 6). In this example, at this time point, the target path is a path formed by connection of the span a and the span e.

Subsequently, the transmission device #2 executes per-path confirmation processing on the target path set by Step S207 described above (Step S208 in FIG. 6). That is, the transmission device #2 recursively executes per-path confirmation processing.

If, as a result of recursively executing per-path confirmation processing, the span number of the target path is more than the upper-limit span number, the transmission device #2 determines, as described above, "NO" in Step S202 in FIG. 6. The transmission device #2 does not execute subsequent steps (Step S203-Step S209) and the process proceeds to the next step following the step which is the basis for execution of per-path confirmation processing which is currently executed.

For example, as the target path, a path formed by connection of the span a, the span b, the span c, the span d, and the span f is set and, when per-path confirmation processing is executed on the target path, the span number of the target path is "5". Thus, in this case, the span number is more than the upper-limit span number. Therefore, the transmission device #2 determines "NO" in Step S202 in FIG. 6 and does not execute the subsequent steps (Step S203-Step S209), and the process proceeds to the next step following the step which is the basis for execution of per-path confirmation processing which is currently executed.

In other words, the transmission device #2 executes processing of determining whether an optical signal of at least one wavelength may be newly transmitted only to a path, among paths formed by a newly used span, whose span number is equal to or less than the upper-limit span number.

The transmission device #2 executes the above-described second loop processing (Steps S206-Step S209 in FIG. 6) to all of adjacent spans, and then, the process proceeds to the next step following the step which is the basis for execution of per-path confirmation processing which is currently executed.

The transmission device #2 executes the above-described first loop processing (Step S103-Step S106 in FIG. 5), and then, the process proceeds to Step S107 in FIG. 5 to all of spans forming the newly used path. Then, the transmission device #2 determines whether there is a path, among the stored spare paths, which does not have a usable resource, on the basis of the per-path resource information updated in Step S203 in FIG. 6 (Step S107 in FIG. 5).

If all of the stored spare paths have a usable resource (that is, there is no spare path which does not have a usable resource), the transmission device #2 determines "NO", the process returns Step S101 in FIG. 5, and the transmission device #2 repeatedly executes processing of Step S101-Step S109.

On the other hand, if there is a path, among the stored spare paths, which does not have a usable resource, the transmission device #2 determines "YES", the process proceeds to Step S108 in FIG. 5. Then, the transmission device #2 outputs notification information (a warning in this example) to inform that there is a path which does not have a usable resource via the output device 400 (Step S108 in FIG. 5).

Subsequently, the transmission device #2 determines, on the basis of the stored per-span resource information, an alternative path for the spare path which does not have a usable resource (Step S109 in FIG. 5). The transmission device #2 updates information indicating a spare path, among the stored spare paths, which does not have a usable resource to information indicating the alternative path determined for the spare path. Furthermore, the transmission device #2 transmits, to an adjacent node, an OSC signal including a spare path change instruction including information indicating the spare path (that is, the alternative path) after update and information indicating the spare path before update.

The transmission device #i which has received the spare path change instruction transfers the spare path change instruction to an adjacent node. Thus, each of the transmission devices #i receives the spare path change instruction. Furthermore, each of the transmission devices #i updates, on the basis of information indicating the spare path (that is, the alternative path) after update and the spare path before update, information indicating the stored spare paths.

Thereafter, the process returns Step S101 in FIG. 5 and the transmission device #2 repeatedly executes processing of Step S101-Step S109.

The processing of Step S103-Step S106 in FIG. 5 and per-path confirmation processing in FIG. 6 are examples of resource confirmation processing.

As described above, the node control unit 250 (the determination device) according to the first embodiment transmits an optical signal of a wavelength among a plurality of wavelength, and executes, if a span is newly used, resource confirmation processing. Resource confirmation processing is processing of determining whether an optical signal of at least one wavelength may be newly transmitted only to a path, among paths formed by a newly used span, whose span number is equal to or less than the upper-limit span number.

Incidentally, as the span number which is the number of spans included in a single path increases, the quality of a transmitted optical signal reduces. Therefore, in order to ensure the quality of a transmitted optical signal to be equal to or higher than preferable quality, the span number is limited. For this reason, in many cases, an optical wavelength division multiplex communication system is configured to determine a path such that the span number is equal to or less than the predetermined upper-limit span number.

As described above, by limiting a path to be a target of the above-described determination, increase of a load of processing for the above-described determination to an excessive level for nothing is not caused. That is, using the node control unit 250, a load of processing may be reduced.

Figure 8:
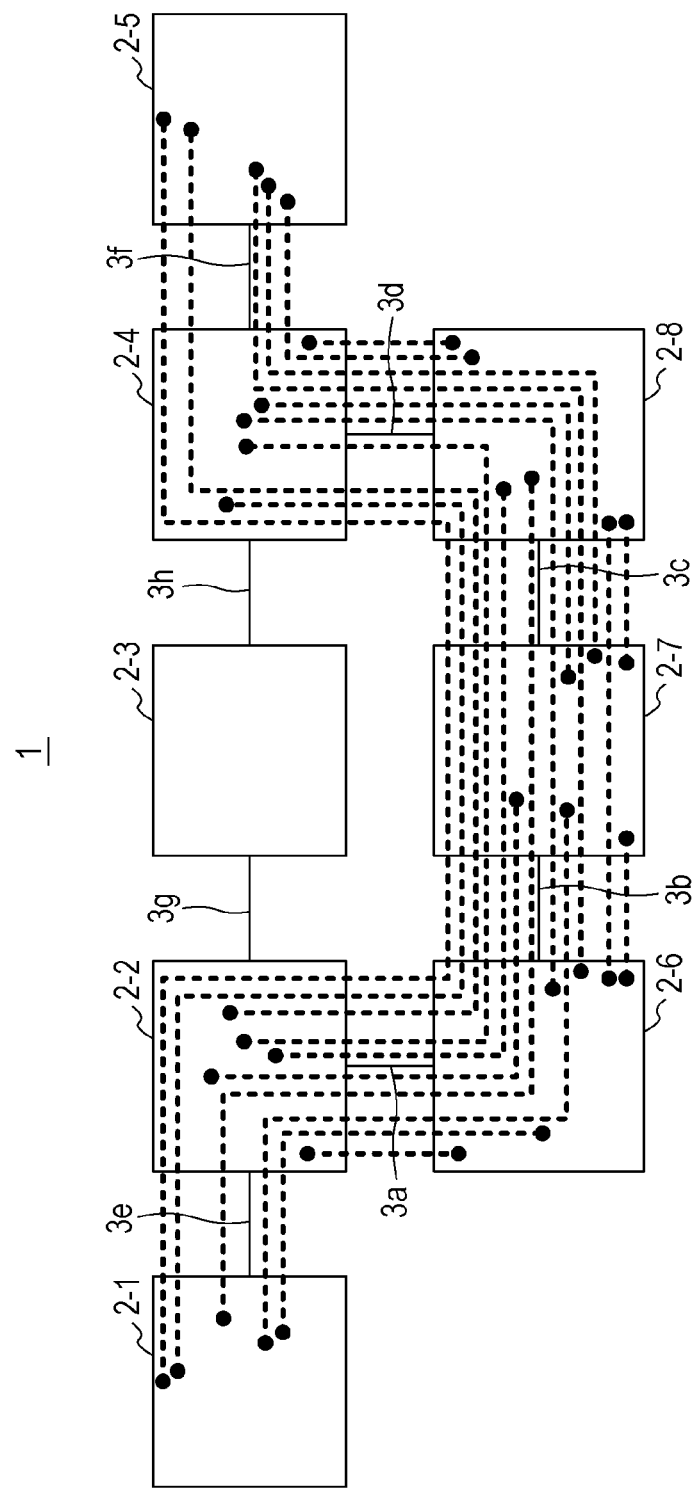
FIG. 8 is a diagram conceptually illustrating a path to be a target of determination in a comparative example optical wavelength division multiplex communication system.
Figure 9:
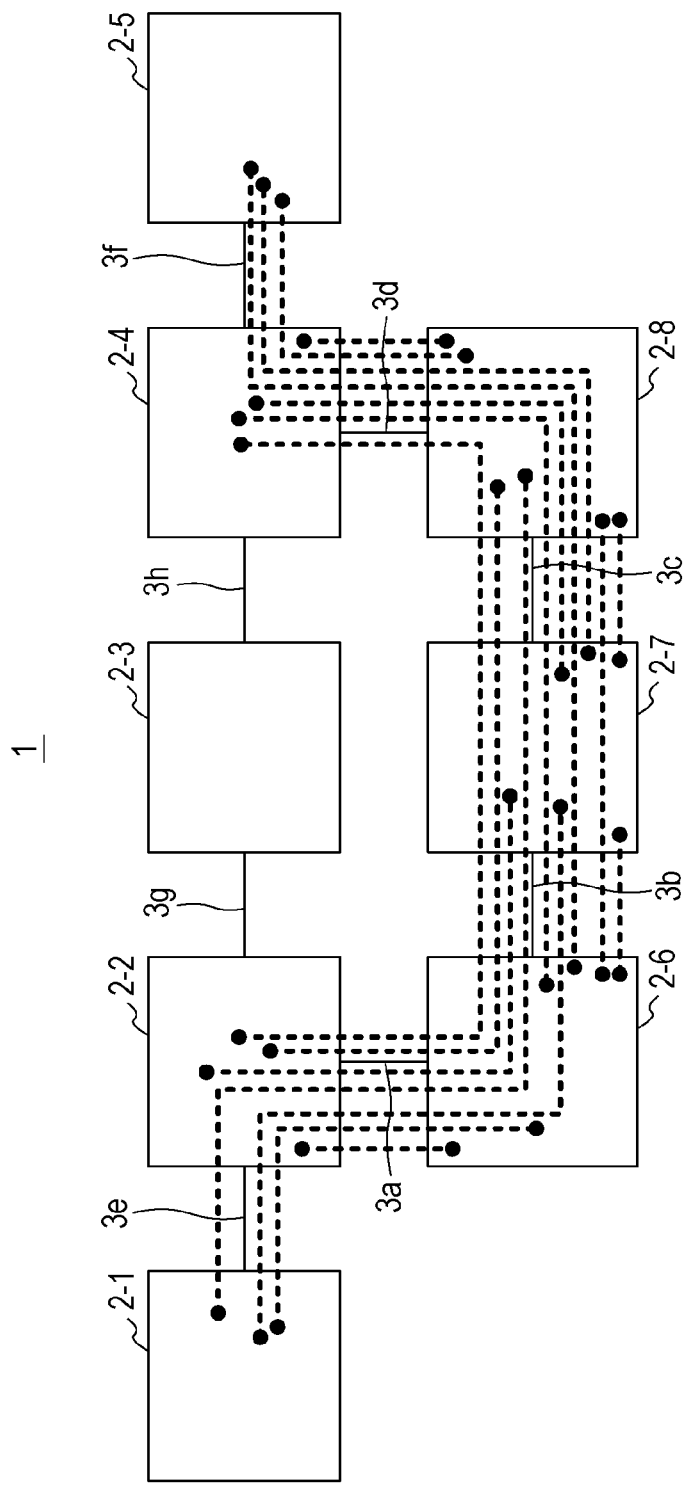
FIG. 9 is a diagram conceptually illustrating a path to be a target of determination in the example optical wavelength division multiplex communication system according to the first embodiment.

Specifically, if the above-described determination is performed on all of paths, as illustrated in FIG. 8, the number of paths to be targets of determination is "19". On the other hand, using the node control unit 250 according to the first embodiment, a path whose span number is "5" or more is removed from the targets of determination. Therefore, using the node control unit 250 according to the first embodiment, as illustrated in FIG. 9, the number of paths to be targets of determination is "16". Thus, using the node control unit 250, a load of processing may be reduced.

Furthermore, the node control unit 250 according to the first embodiment transmits an optical signal of a wavelength, among the plurality of wavelengths, and therefore, performs the above-described determination immediately after use of a span is newly started.

Thus, execution of the above-described determination may be completed earlier than a time point at which processing (switching of a path in this example) on the basis of a determination result is executed, and therefore, an excessive delay of processing performed on the basis of the determination result is not caused.

In addition, the node control unit 250 according to the first embodiment detects the occurrence of a failure in each span, and switches, when the occurrence of a failure is detected, a path formed by a span in which the failure has occurred to a path which bypasses the span. Furthermore, the node control unit 250 determines the above-described determination immediately after switching of a path is completed.

Thus, execution of the above-described determination may be completed earlier than a time point at which the occurrence of a failure is detected next, and therefore, an excessive delay of switching of a path along with the occurrence of a next failure is not caused.

Furthermore, when it is determined that none of optical signals of the plurality of wavelengths may be newly transmitted to at least one path, the node control unit 250 according to the first embodiment informs the determination result.

Thus, it is possible to cause a user (for example, an administrator of the optical wavelength division multiplex communication system 1, and the like) to quickly recognize that an optical signal may not be newly transmitted in a path.

Note that the node control unit 250 according to the first embodiment is configured to execute resource confirmation processing each time a path is switched, but may be configured to execute resource confirmation processing each time the number of times of switching a path reaches a predetermined cycle number (for example, an natural number of 2 or more).

In this case, the node control unit 250 may be configured to change the cycle number for each wavelength. Furthermore, in this case, the node control unit 250 may use "1" as the cycle number. That is, the node control unit 250 may be configured to execute, when a failure occurs in a path in which an optical signal of a waveform which has been set in advance is transmitted, resource confirmation processing each time a path is switched and also to execute, when a failure occurs in a path in which an optical signal of another wavelength is transmitted, resource confirmation processing each time the number of times of switching a path reaches a predetermined cycle number (for example, a natural number of 2 or more).

Also, the node control unit 250 according to the first embodiment is configured to execute resource confirmation processing on a path formed by a newly used span. Incidentally, the node control unit 250 may be configured to execute resource confirmation processing only on a spare path among paths formed by a newly used span.

Next, an optical wavelength division multiplex communication system according to a first modified example of the first embodiment will be described. The optical wavelength division multiplex communication system according to the first modified example is different from the optical wavelength division multiplex communication system according to the above-described first embodiment in that the upper-limit span number in accordance with a modulation method is used. With focus on the above-described difference, the description will be given below. Note that, in the description of the first modified example, elements denoted by the same reference characters as those used in the above-described first embodiment are the same as or substantially similar to elements denoted by the reference numerals in the first embodiment.

Configuration

An optical wavelength division multiplex communication system 1 according to the first modified example is configured to set each of a plurality of different modulation methods for the corresponding one of a plurality of different wavelengths. In this example, the plurality of modulation methods is an intensity modulation method in which the intensity of an optical signal is modulated and a phase modulation method in which the phase of an optical signal is modulated. Note that the optical wavelength division multiplex communication system 1 may be configured to set a different modulation method for each path.

The optical wavelength division multiplex communication system 1 is configured to generate an optical signal of each wavelength in accordance with a modulation method set for the wavelength and transmit the generated optical signal via a path set for the wavelength. In this example, the optical wavelength division multiplex communication system 1 transmits an optical signal generated in accordance with the intensity modulation method at 10 Gbit/s and an optical signal generated in accordance with the phase modulation method at 100 Gbit/s.

Figure 10:
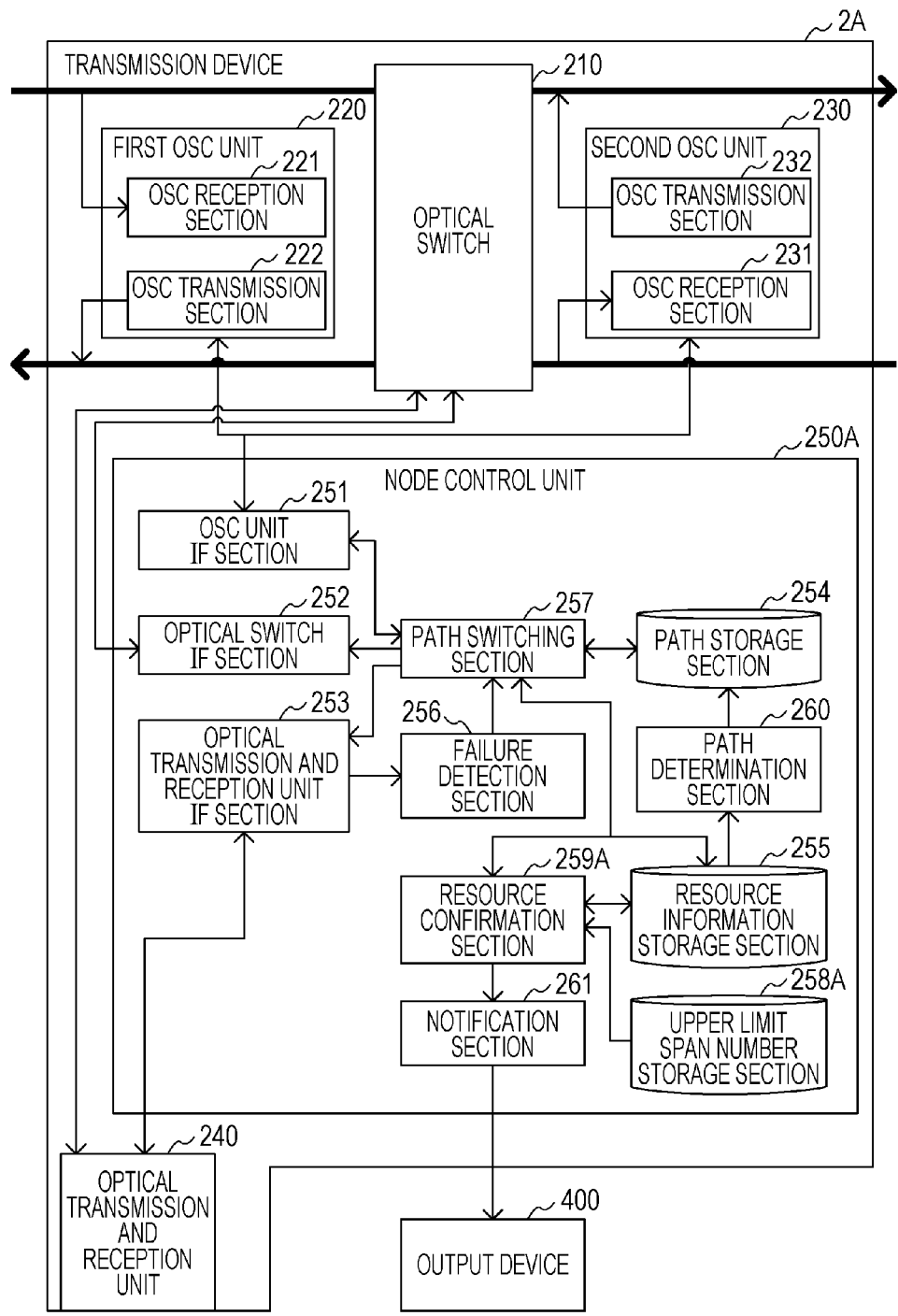
FIG. 10 is a diagram illustrating a configuration of an example transmission device according to a first modified example of the first embodiment.

As illustrated in FIG. 10, a transmission device 2A according to the first modified example includes, instead of the node control unit 250, a node control unit 250A. Furthermore, the node control unit 250A includes, instead of the upper-limit span number storage section 258, an upper-limit span number storage section 258A and, instead of the resource confirmation section 259, a resource confirmation section 259A.

As illustrated in FIG. 11, the upper-limit span number storage section 258A stores in advance information indicating the modulation method and information indicating the upper-limit span number in association with each other.

Furthermore, the upper-limit span number storage section 258A stores in advance information indicating the wavelength and information indicating the modulation method in association with each other. In this example, as illustrated in FIG. 12, the upper-limit span number storage section 258A stores wavelengths #1-#4 and the phase modulation method in association with each other and wavelengths #5-#8 and the intensity modulation method in association with each other.

The resource confirmation section 259A executes resource confirmation processing, on the basis of per-span resource information stored in the resource information storage section 255 and information stored in the upper-limit span number storage section 258A.

Specifically, the resource confirmation section 259A uses, as the upper-limit span number, a value determined in advance in accordance with the modulation method set in advance for a usable wavelength in a path to be a determination target.

Operation

Figure 13:
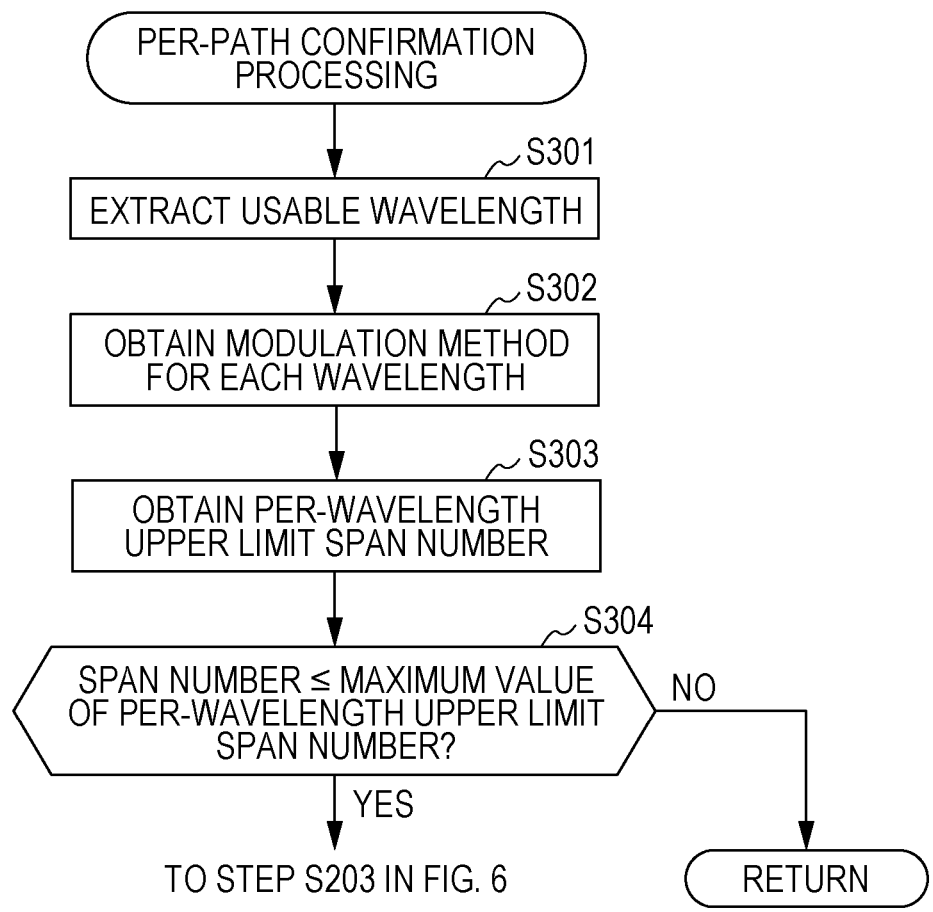
FIG. 13 is a flowchart illustrating a part of per-path confirmation processing executed by an example transmission device according to the first modified example of the first embodiment.

The transmission device 2A according to the first modified example executes, as per-path confirmation processing, processing in which Step S201 and Step S202 of the processing illustrated in FIG. 6 are replaced with Step S301-Step S304 in FIG. 13.

Specifically, the transmission device 2A extracts a usable wavelength in a target path, on the basis of the stored per-span resource information (Step S301 in FIG. 13). Furthermore, the transmission device 2A obtains the modulation method stored in association with each of extracted wavelengths (Step S302 in FIG. 13).

Then, the transmission device 2A obtains, for each of extracted wavelengths, the upper-limit span number stored in association with the obtained modulation method, as a per-wavelength upper-limit span number (Step S303 in FIG. 13). Subsequently, the transmission device 2A determines whether the span number of the target path is equal to or less than the maximum value (the upper-limit span number) of the obtained per-wavelength upper-limit span number (Step S304 in FIG. 13).

That is, in other words, in this example, the transmission device 2A uses, as the upper-limit span number, a value determined in advance in accordance with a modulation method set in advance for a usable wavelength in a path (a target path) to be a determination target.

Then, if the span number of the target path is equal to or less than the upper-limit span number, the transmission device 2A executes processing of Step S203 and subsequent steps in FIG. 6. On the other hand, if the span number of the target path is more than the upper-limit span number, in the transmission device 2A, the process proceeds to the next step (Step S106 in FIG. 5 or Step S209 in FIG. 6) following the step which is the basis for execution of per-path confirmation processing which is currently executed.

As described above, using the node control unit 250A according to the first modified example, similar functions and advantages to those of the node control unit 250 according to the first embodiment may be achieved.

Furthermore, the node control unit 250A according to the first modified example uses, as the upper-limit span number, a value determined in advance in accordance with a modulation method set in advance for a usable wavelength in a path to be a determination target.

Incidentally, an optical signal in accordance with the phase modulation method is more sensitive to a non-linear effect of cross phase modulation (XPM) and the like than an optical signal in accordance with the intensity modulation method. Accordingly, the upper-limit span number in accordance with the phase modulation method is less than the upper-limit span number in accordance with the intensity modulation method. Thus, as described above, a value determined in advance in accordance with a modulation method is used as the upper-limit span number and thereby a path to be a determination target may be appropriately selected.

Next, an optical wavelength division multiplex communication system according to a second modified example of the first embodiment will be described. The optical wavelength division multiplex communication system according to the second modified example is different from the optical wavelength division multiplex communication system according to the first embodiment in that the upper-limit span number in accordance with a guard band is used. With focus on the above-described difference, the description will be given below. Note that, in the description of the second modified example, elements denoted by the same reference characters as those used in the above-described first embodiment are the same as or substantially similar to elements denoted by the reference characters in the first embodiment. Herein, the term "guard band" represents a distance (that is, a difference in wavelength) in a wavelength region between adjacent wavelengths in the wavelength region to which an optical signal allocated.

Configuration

An optical wavelength division multiplex communication system 1 according to the second modified example is configured to set each of a plurality of different modulation methods for the corresponding one of a plurality of different wavelengths. In this example, the plurality of modulation methods is an intensity modulation method in which the intensity of an optical signal is modulated and a phase modulation method in which the phase of an optical signal is modulated. Note that the optical wavelength division multiplex communication system 1 may be configured to set a different modulation method for each path.

The optical wavelength division multiplex communication system 1 is configured to generate an optical signal of each wavelength in accordance with a modulation method set for the wavelength and transmit the generated optical signal via a path set for the wavelength. In this example, the optical wavelength division multiplex communication system 1 transmits an optical signal generated in accordance with the intensity modulation method at 10 Gbit/s and an optical signal generated in accordance with the phase modulation method at 100 Gbit/s.

Figure 14:
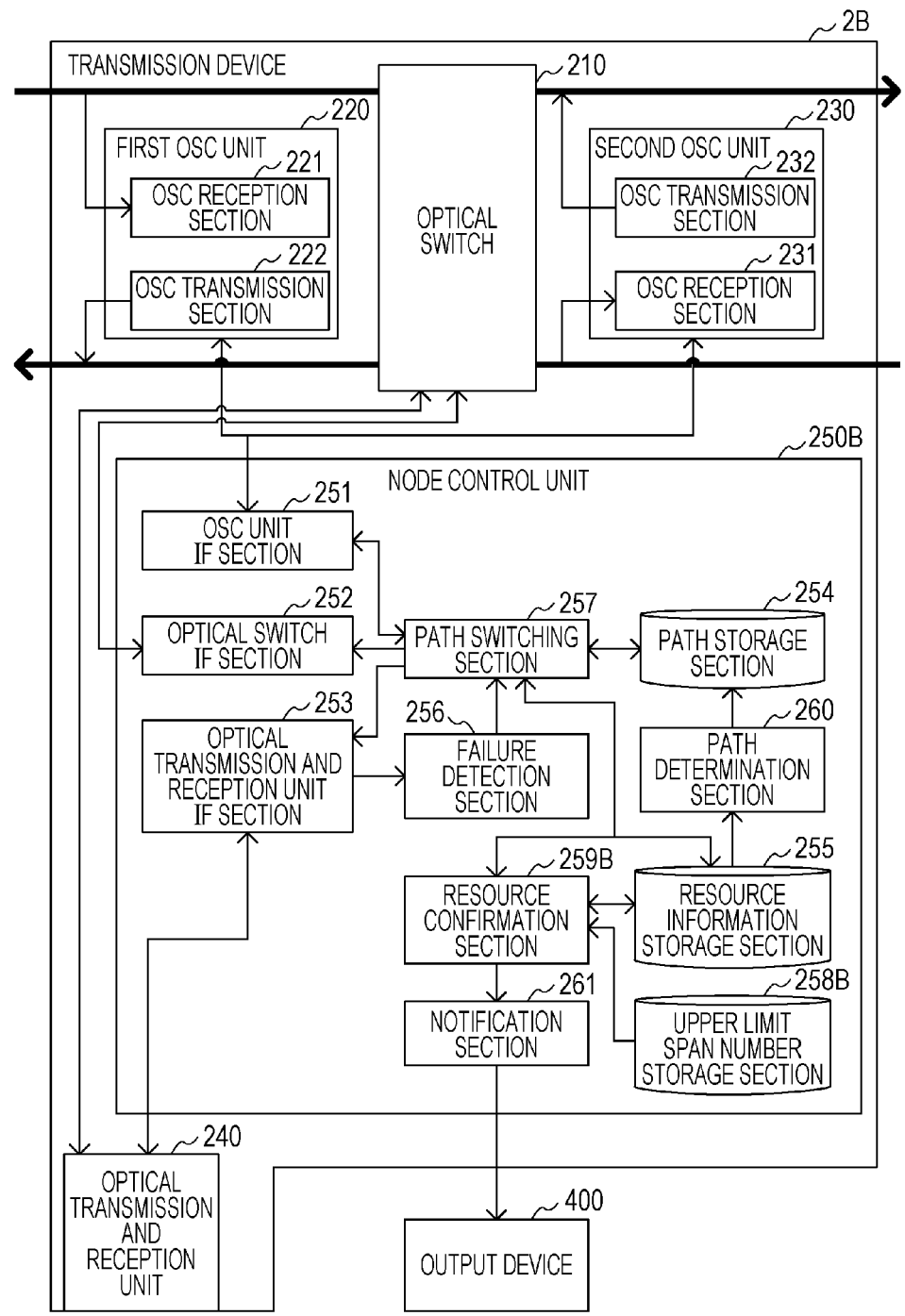
FIG. 14 is a diagram illustrating a configuration of an example transmission device according to a second modified example of the first embodiment.

As illustrated in FIG. 14, a transmission device 2B according to the second modified example includes, instead of the node control unit 250, a node control unit 250B. Furthermore, the node control unit 250B includes, instead of the upper-limit span number storage section 258, an upper-limit span number storage section 258B and, instead of the resource confirmation section 259, a resource confirmation section 259B.

As illustrated in FIG. 15, the upper-limit span number storage section 258B stores in advance information indicating the modulation method, information indicating the guard band, and information indicating the upper-limit span number in association with one another.

In addition, as illustrated in FIG. 16, the upper-limit span number storage section 258B stores in advance information indicating the span and information indicating the guard span in the span in association with each other.

Furthermore, the upper-limit span number storage section 258B stores in advance information indicating the wavelength and information indicating the modulation method in association with each other. In this example, as illustrated in FIG. 12, the upper-limit span number storage section 258B stores wavelengths #1-#4 and the phase modulation method in association with each other and wavelengths #5-#8 and the intensity modulation method in association with each other.

The resource confirmation section 259B executes resource confirmation processing, on the basis of per-span resource information stored in the resource information storage section 255 and information stored in the upper-limit span number storage section 258B.

Specifically, the resource confirmation section 259B uses, as the upper-limit span number, a value determined in advance in accordance with the modulation method set in advance for a usable wavelength in a path to be a determination target and the minimum value of the guard band for spans forming the path to be a determination target.

Operation

Figure 17:
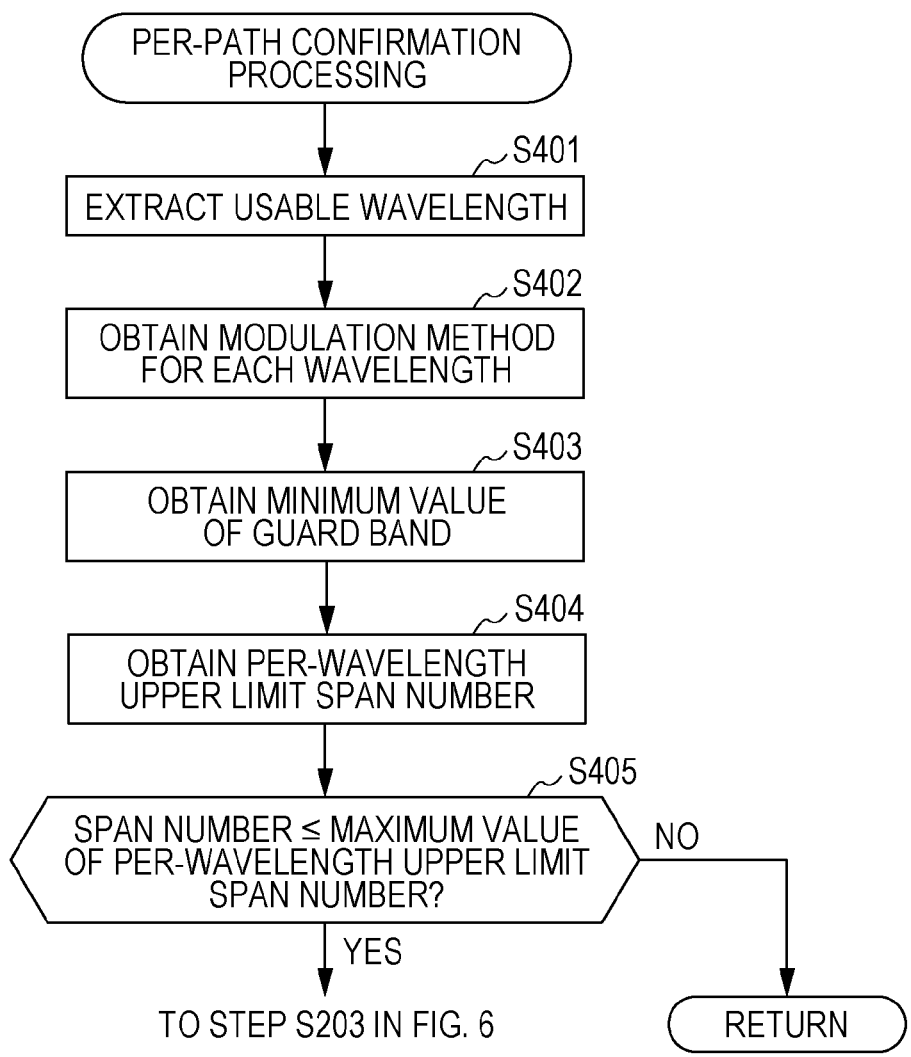
FIG. 17 is a flowchart illustrating a part of per-path confirmation processing executed by an example transmission device according to the second modified example of the first embodiment.

The transmission device 2B according to the second modified example executes, as per-path confirmation processing, processing in which Step S201 and Step S202 of the processing illustrated in FIG. 6 are replaced with Step S401-Step S405 in FIG. 17.

Specifically, the transmission device 2B extracts a usable wavelength in a target path, on the basis of the stored per-span resource information (Step S401 in FIG. 17). Furthermore, the transmission device 2B obtains the modulation method stored in association with each of extracted wavelengths (Step S402 in FIG. 17). Subsequently, the transmission device 2B obtains the minimum value of the guard bands stored in association with each of spans forming the target path (Step S403 in FIG. 17).

Then, the transmission device 2B obtains, for each of extracted wavelengths, the upper-limit span number stored in association with the obtained modulation method and the obtained minimum value of the guard bands, as a per-wavelength upper-limit span number (Step S404 in FIG. 17). Subsequently, the transmission device 2B determines whether the span number of the target path is equal to or less than the maximum value (the upper-limit span number) of the obtained per-wavelength upper-limit span number (Step S405 in FIG. 17).

That is, in other words, in this example, the transmission device 2B uses, as the upper-limit span number, a value determined in advance in accordance with a modulation method set in advance for a usable wavelength in a path (a target path) to be a determination target and the minimum value of the guard band for spans forming the target path.

Then, if the span number of the target path is equal to or less than the upper-limit span number, the transmission device 2B executes processing of Step S203 and subsequent steps in FIG. 6. On the other hand, if the span number of the target path is more than the upper-limit span number, in the transmission device 2B, the process proceeds to the next step (Step S106 in FIG. 5 or Step S209 in FIG. 6) following the step which is the basis for execution of per-path confirmation processing which is currently executed.

As described above, using the node control unit 250B according to the second modified example, similar functions and advantages to those of the node control unit 250 according to the first embodiment may be achieved.

Furthermore, the node control unit 250B according to the second modified example uses, as the upper-limit span number, a value determined in advance in accordance with the minimum value of the guard band for spans forming a path to be a determination target.

Incidentally, as the guard band reduces, the sensitivity of an optical signal to a non-linear effect of cross phase modulation and the like increases. That is, as the guard band reduces, the upper-limit span number reduces. Thus, as described above, a value determined in advance in accordance with the minimum value of the guard band for spans forming a path is used as the upper-limit span number and thereby a path to be a determination target may be appropriately selected.

Figure 18:
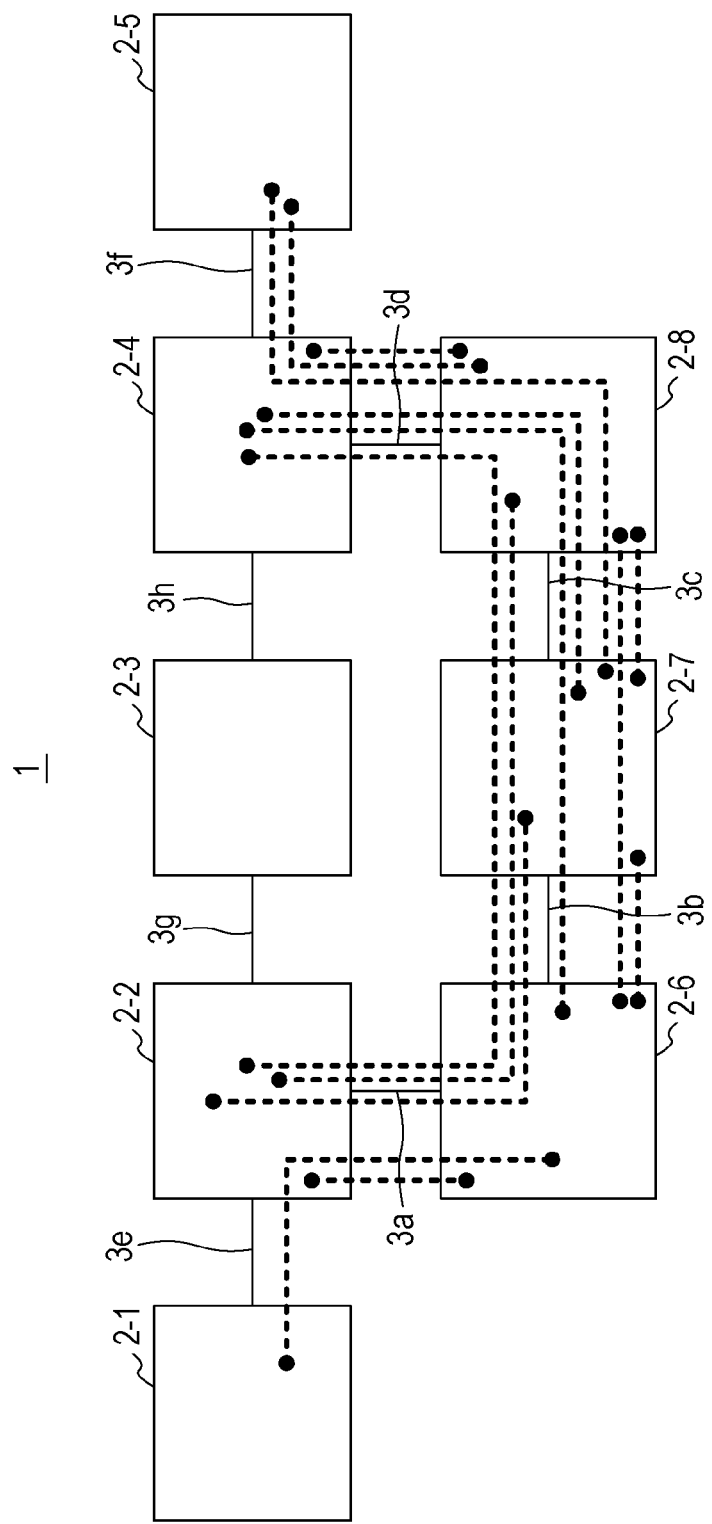
FIG. 18 is a diagram conceptually illustrating a path to be a target of determination in an example optical wavelength division multiplex communication system according to the second modified example of the first embodiment.

Specifically, if the above-described determination is performed on all of paths, as illustrated in FIG. 8, the number of paths to be determination targets is "19". On the other hand, using the node control unit 250B according to the second modified example, when the phase modulation method is set for all of the wavelengths and the guard band and the upper-limit span number are set as illustrated in FIG. 15 and FIG. 16, as illustrated in FIG. 18, the number of paths to be determination targets is "13". Thus, using the node control unit 250B, a load of processing may be reduced.

Next, an optical wavelength division multiplex communication system according to a third modified example of the first embodiment will be described. The optical wavelength division multiplex communication system according to the third modified example is different from the optical wavelength division multiplex communication system according to the above-described first embodiment in that the upper-limit span number in accordance with the type of an optical fiber is used. With focus on the above-described difference, the description will be given below. Note that, in the description of the third modified example, elements denoted by the same reference characters as those used in the above-described first embodiment are the same as or substantially similar to elements denoted by the reference characters in the first embodiment.

Configuration

An optical wavelength division multiplex communication system 1 according to the third modified example is configured to set each of a plurality of different modulation methods for the corresponding one of a plurality of different wavelengths. In this example, the plurality of modulation methods is an intensity modulation method in which the intensity of an optical signal is modulated and a phase modulation method in which the phase of an optical signal is modulated. Note that the optical wavelength division multiplex communication system 1 may be configured to set a different modulation method for each path.

The optical wavelength division multiplex communication system 1 is configured to generate an optical signal of each wavelength in accordance with a modulation method set for the corresponding wavelength and transmit the generated optical signal via a path set for the corresponding wavelength. In this example, the optical wavelength division multiplex communication system 1 transmits an optical signal generated in accordance with the intensity modulation method at 10 Gbit/s and an optical signal generated in accordance with the phase modulation method at 100 Gbit/s.

Figure 19:
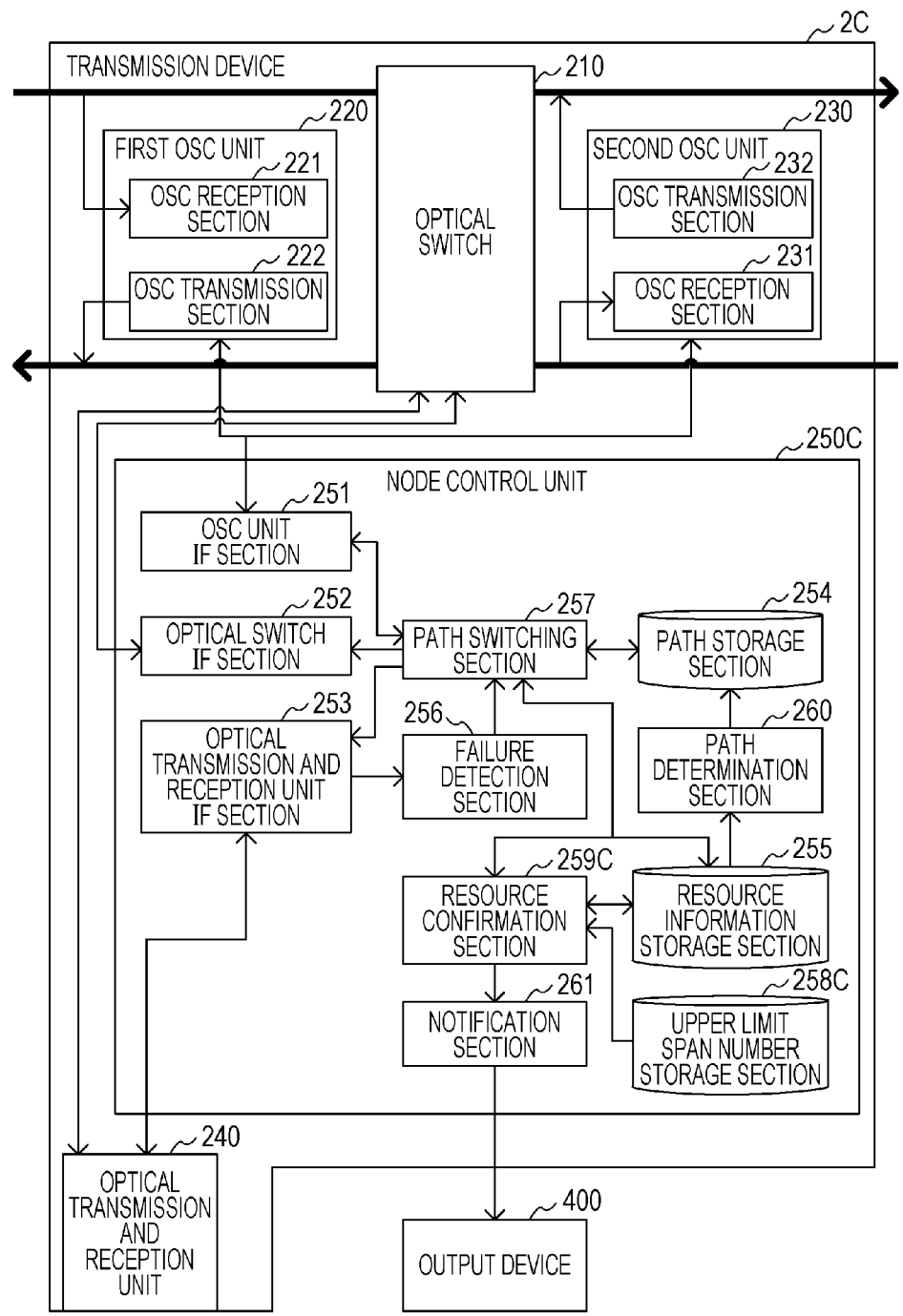
FIG. 19 is a diagram illustrating a configuration of an example transmission device according to a third modified example of the first embodiment.

As illustrated in FIG. 19, a transmission device 2C according to the third modified example includes, instead of the node control unit 250, a node control unit 250C. Furthermore, the node control unit 250C includes, instead of the upper-limit span number storage section 258, an upper-limit span number storage section 258C and, instead of the resource confirmation section 259, a resource confirmation section 259C.

As illustrated in FIG. 20, the upper-limit span number storage section 258C stores in advance information indicating the modulation method, information indicating the type of an optical fiber (the fiber type), and information indicating the upper-limit span number in association with each other.

In addition, as illustrated in FIG. 21, the upper-limit span number storage section 258C stores in advance information indicating the span and the information indicating the fiber type of the span in association with each other.

Furthermore, the upper-limit span number storage section 258C stores in advance information indicating the wavelength and information indicating the modulation method in association with each other. In this example, as illustrated in FIG. 12, the upper-limit span number storage section 258C stores wavelengths #1-#4 and the phase modulation method in association with each other and wavelengths #5-#8 and the intensity modulation method in association with each other.

The resource confirmation section 259C executes resource confirmation processing, on the basis of per-span resource information stored in the resource information storage section 255 and information stored in the upper-limit span number storage section 258C.

Specifically, the resource confirmation section 259C uses, as the upper-limit span number, a value determined in advance in accordance with the modulation method set in advance for a usable wavelength in a path to be a determination target and the type of an optical fiber for spans forming the path to be a determination target.

Operation

Figure 22:
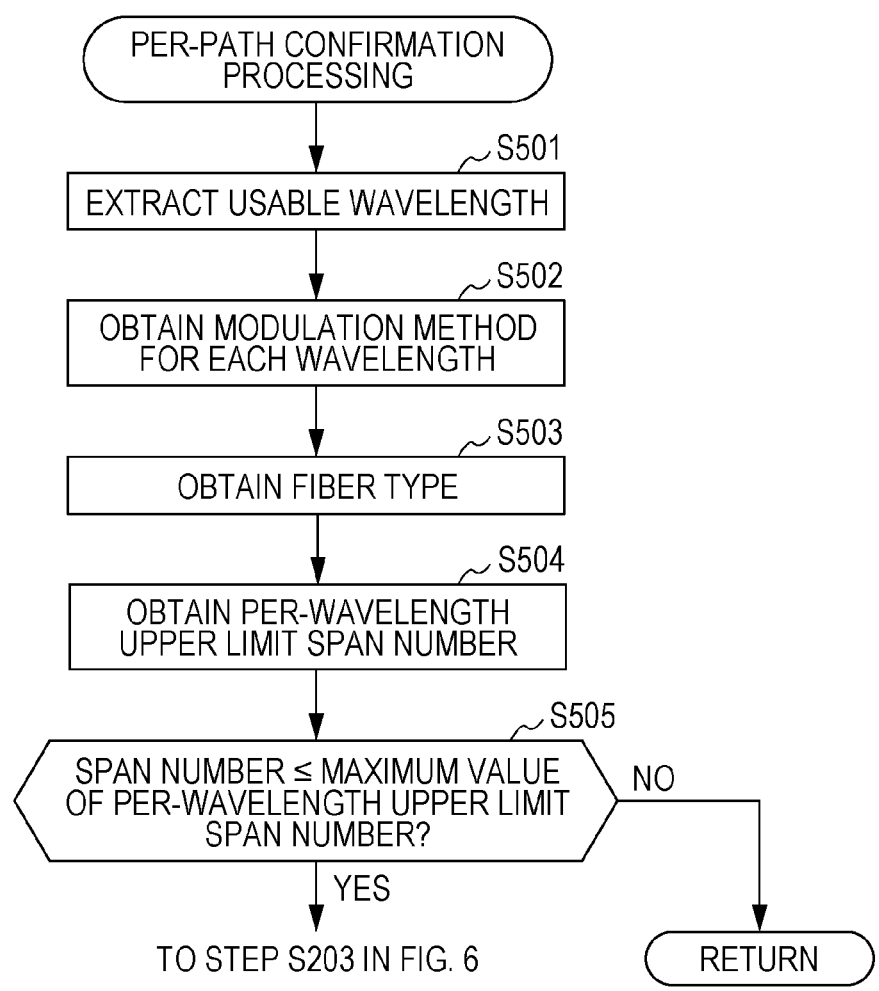
FIG. 22 is a flowchart illustrating a part of per-path confirmation executed by an example transmission device according to the third modified example of the first embodiment.

The transmission device 2C according to the third modified example executes, as per-path confirmation processing, processing in which Step S201 and Step S202 of the processing illustrated in FIG. 6 are replaced with Step S501-Step S505 in FIG. 22.

Specifically, the transmission device 2C extracts a usable wavelength in a target path, on the basis of the stored per-span resource information (Step S501 in FIG. 22). Furthermore, the transmission device 2C obtains the modulation method stored in association with each of extracted wavelengths (Step S502 in FIG. 22). Subsequently, the transmission device 2C obtains the fiber type stored in association with each of the spans forming the target path (Step S503 in FIG. 22).

Then, the transmission device 2C obtains, for each of extracted wavelengths, the upper-limit span number stored in association with the obtained modulation method and the obtained fiber type for each of spans forming the target path, as a per-element upper-limit span number. Subsequently, the transmission device 2C obtains the minimum value (the per-wavelength upper-limit span number) of a per-element upper-limit span number obtained for each of extracted wavelengths (Step S504 in FIG. 22).

Then, the transmission device 2C determines whether the span number of the target path is equal to or less than the maximum value (the upper-limit span number) of the obtained per-wavelength upper-limit span number (Step S505 in FIG. 22).

That is, in other words, in this example, the transmission device 2C uses, as the upper-limit span number, the maximum value (the per-wavelength upper-limit span number) of a value determined in advance in accordance with the type of an optical fiber for spans forming a path (a target path) to be a determination target.

Then, if the span number of the target path is equal to or less than the upper-limit span number, the transmission device 2C executes processing of Step S203 and subsequent steps in FIG. 6. On the other hand, if the span number of the target path is more than the upper-limit span number, in the transmission device 2C, the process proceeds to the next step (Step S106 in FIG. 5 or Step S209 in FIG. 6) following the step which is the basis for execution of per-path confirmation processing which is currently executed.

As described above, using the node control unit 250C according to the third modified example, similar functions and advantages to those of the node control unit 250 according to the first embodiment may be achieved.

Furthermore, the node control unit 250C according to the third modified example uses, as the upper-limit span number, the maximum value of a value determined in advance in accordance with the type of an optical fiber for spans forming a path to be a determination target.

Incidentally, an optical signal transmitted in NZ-DSF is more sensitive to a non-linear effect of cross phase modulation and the like than an optical signal transmitted in SMF. Accordingly, the upper-limit span number for NZ-DSF is less than the upper-limit span number for SMF. Thus, as described above, the minimum value of a value determined in advance in accordance with the type of an optical fiber for spans forming a path is used as the upper-limit span number and thereby a path to be a determination target may be appropriately selected.

Figure 23:
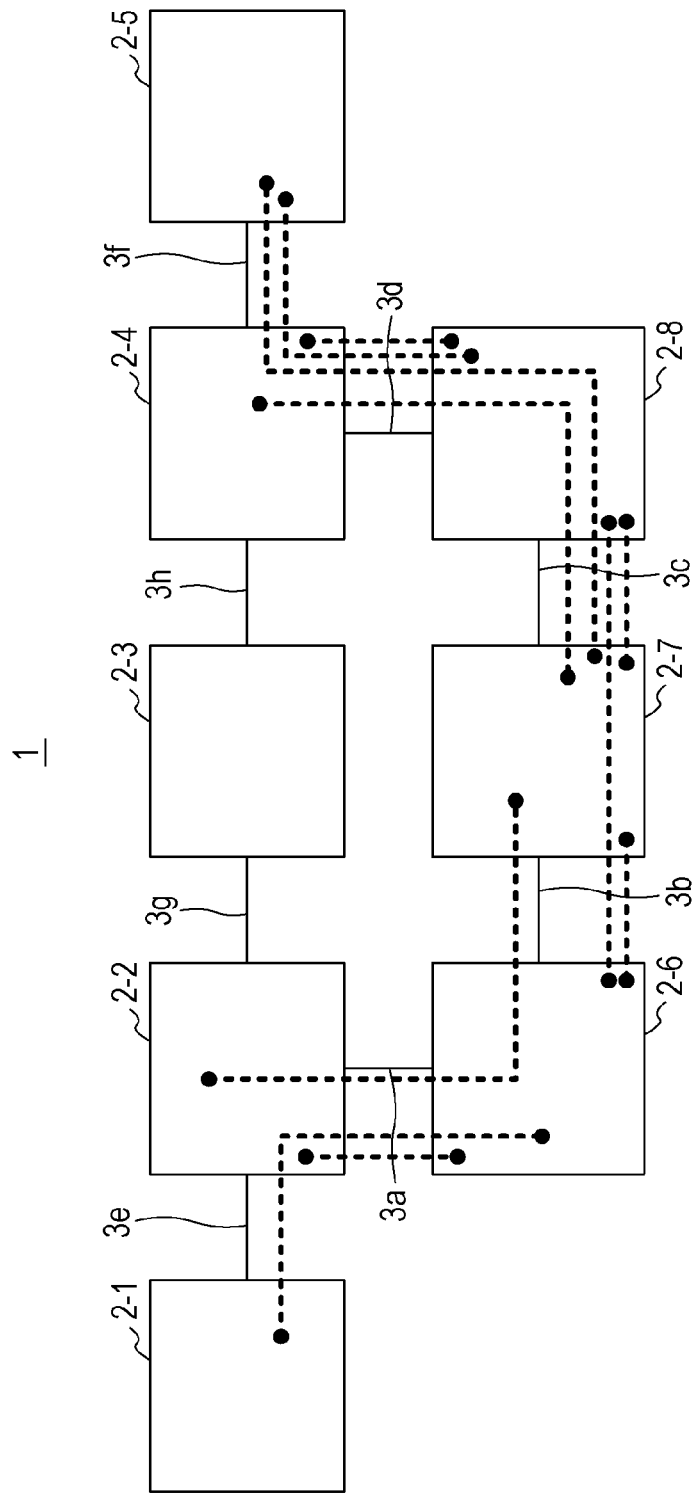
FIG. 23 is a diagram conceptually illustrating a path to be target of determination in an example optical wavelength division multiplex communication system according to the third modified embodiment of the first embodiment.

Specifically, if the above-described determination is performed on all of paths, as illustrated in FIG. 8, the number of paths to be determination targets is "19". On the other hand, using the node control unit 250C according to the third modified example, when the phase modulation method is set for all of the wavelengths and the fiber type and the upper-limit span number are set as illustrated in FIG. 20 and FIG. 21, as illustrated in FIG. 23, the number of paths to be determination targets is "10". Thus, using the node control unit 250C, a load of processing may be reduced.

Next, an optical wavelength division multiplex communication system according to a second embodiment will be described. The optical wavelength division multiplex communication system according to the second embodiment is different from the optical wavelength division multiplex communication system according to the above-described first embodiment in that a management device other than the transmission device includes a determination device. With focus on the above-described difference, the description will be given below. Note that, in the description of the second embodiment, elements denoted by the same reference characters as those used in the above-described first embodiment are the same as or substantially similar to elements denoted by the reference characters in the first embodiment.

Configuration

Figure 24:
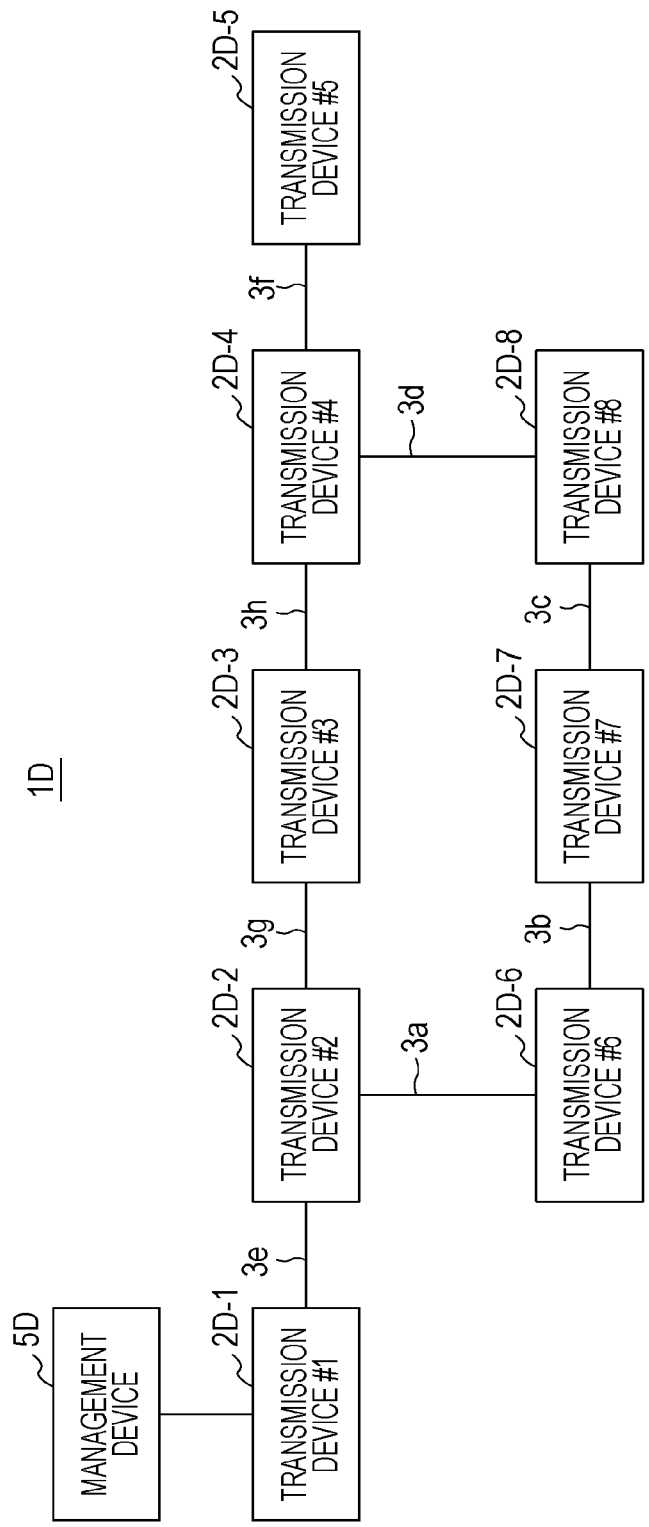
FIG. 24 is a diagram illustrating an example optical wavelength division multiplex communication system according to a second embodiment.

As illustrated in FIG. 24, an optical wavelength division multiplex communication system 1D according to the second embodiment includes a plurality of transmission devices (eight transmission devices in this example) (nodes) 2D-i (where is an natural number of 1 to 8) and a management device 5D. Note that the number of the plurality of transmission devices included in the optical wavelength division multiplex communication system 1D may be a plural number other than 8. Note that the transmission devices 2D-i will be hereinafter also referred to as merely "transmission devices #i". When being described without specifying an individual one or ones of the transmission devices 2D-i, the transmission devices 2D-i are also referred to as merely "transmission devices 2D".

In this example, the management device 5D is connected to the transmission device 2D-1. Note that the management device 5D may be connected to each of transmission device 2D-i. Also, the management device 5D may be a device called a network management system (NMS) or a path computation element (PCE).

Figure 25:
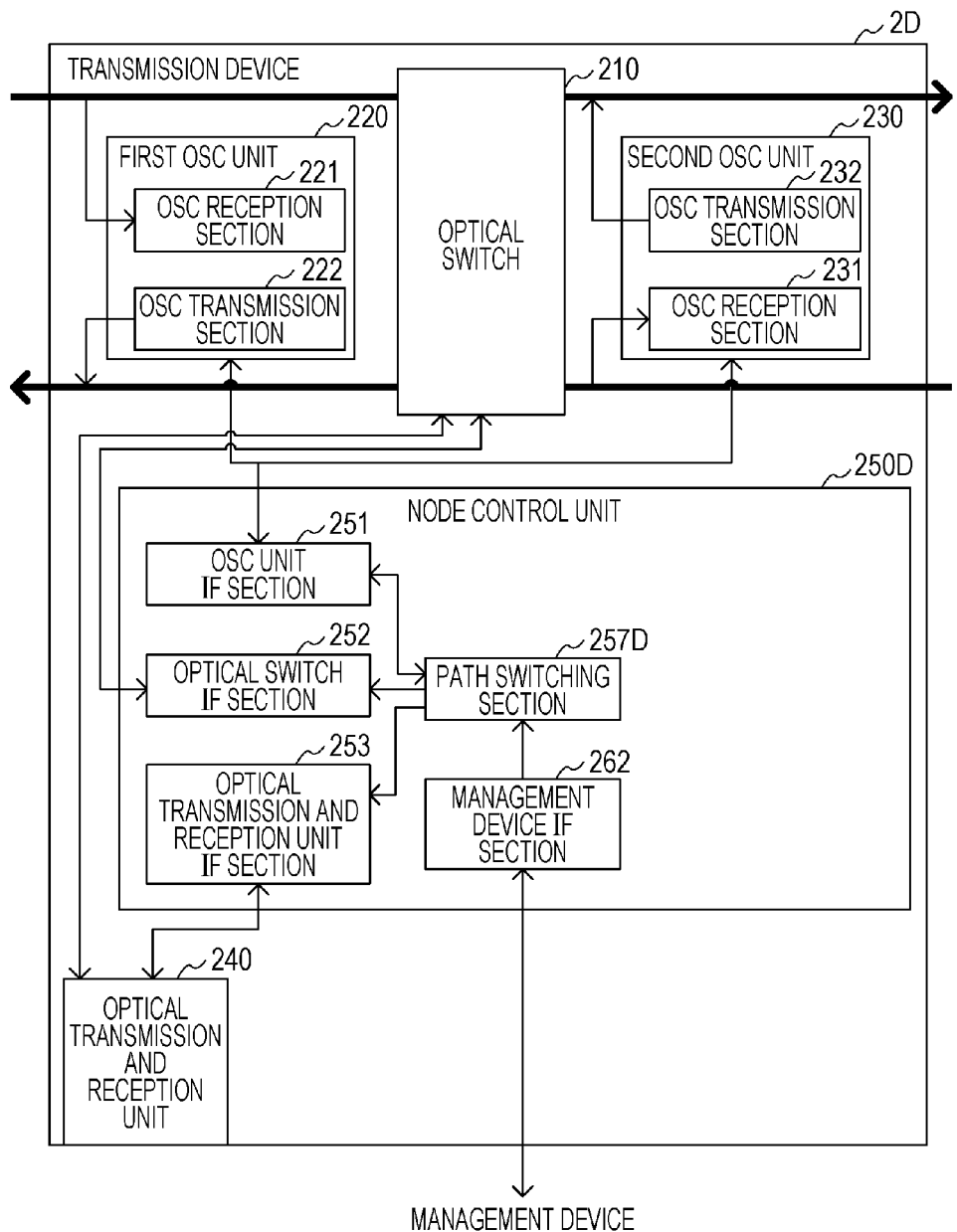
FIG. 25 is a diagram illustrating a configuration of an example transmission device according to the second embodiment.

As illustrated in FIG. 25, the transmission device 2D includes, instead of the node control unit 250, a node control unit 250D.

The node control unit 250D includes, instead of the path switching section 257, a path switching section 257D. Furthermore, the node control unit 250D includes a management device IF section 262. Note that, unlike the node control the node control unit 250, the node control unit 250D does not include the path storage section 254, the resource information storage section 255, the failure detection section 256, the upper-limit span number storage section 258, the resource confirmation section 259, the path determination section 260, and the notification section 261.

The management device IF section 262 is an interface used for transmitting and receiving a control signal to and from the management device 5D.

When the path switching section 257D receives a control signal as a path switching instruction from the management device 5D via the management device IF section 262, the path switching section 257D performs setting for each of the optical switch 210 and the optical transmission and reception unit 240 in accordance with the path switching instruction. The path switching instruction includes information indicating a path and a wavelength before switching and a path and a wavelength after switching.

Figure 26:
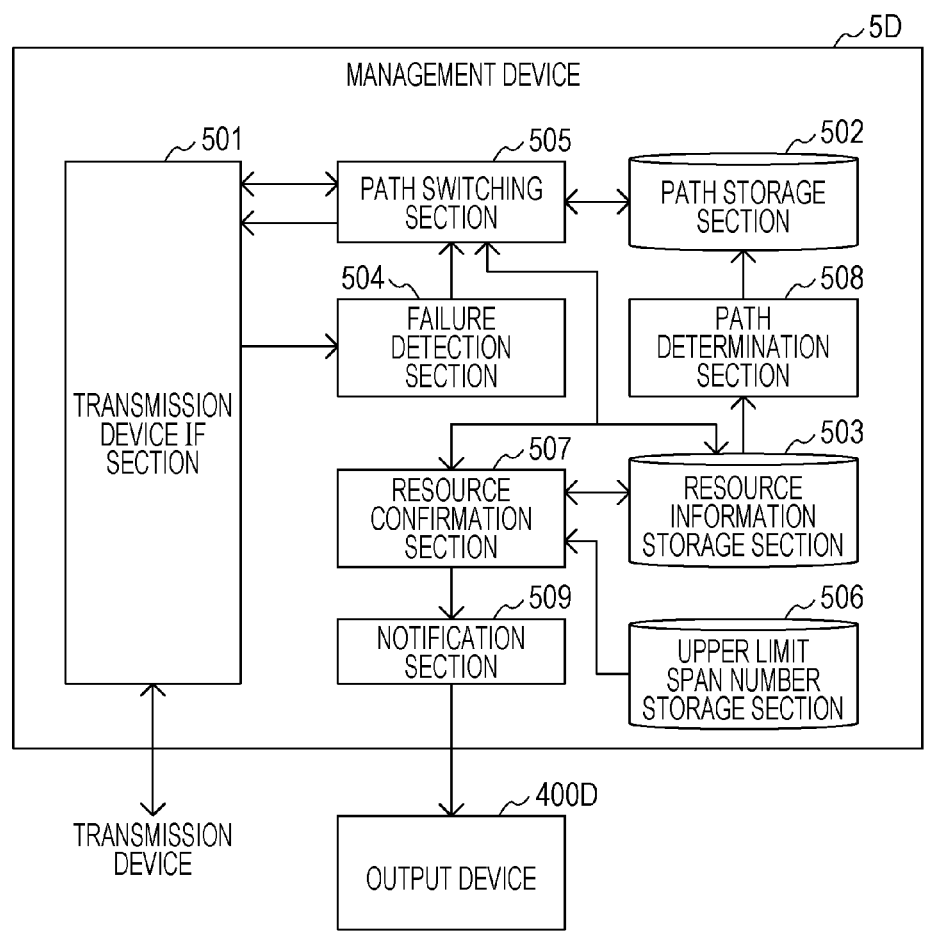
FIG. 26 is a diagram illustrating a configuration of an example management device according to the second embodiment.

As illustrated in FIG. 26, the management device 5D includes a transmission device IF section 501, a path storage section 502, a resource information storage section 503, a failure detection section (a failure detection part) 504, a path switching section (a path switching part) 505, an upper-limit span number storage section 506, a resource confirmation section (a determination part) 507, a path determination section 508, and a notification section (a notification part) 509. Note that the management device 5D is an example of the determination device. Also, the management device 5D may have a function other than the determination device.

The transmission device IF section 501 is an interface used for transmitting and receiving a control signal to and from the transmission device 2D.

The path storage section 502, the resource information storage section 503, the failure detection section 504, the upper-limit span number storage section 506, the resource confirmation section 507, and the path determination section 508 have similar functions to those of the path storage section 254, the resource information storage section 255, the failure detection section 256, the upper-limit span number storage section 258, the resource confirmation section 259, and the path determination section 260, respectively.

The path switching section 505 has similar functions to the other parts of the function of the path switching section 257 than a part thereof of switching a path of the self-device.

If it is determined by the resource confirmation section 507 that none of optical signals of a plurality of wavelengths may be newly transmitted to at least one path (that is, at least one path does not have a usable resource), the notification section 509 outputs notification information to inform the above-described determination result to an output device 400D. The output device 400D includes a display device (for example, a display) and displays, when notification information is input thereto, notification information on the display device.

Instead of the transmission device 2D, the management device 5D executes processing illustrated in FIG. 5 and FIG. 6 and thereby the optical wavelength division multiplex communication system 1D according to the second embodiment operates in the same manner as the optical wavelength division multiplex communication system 1 according to the first embodiment.

Therefore, using the management device 5D according to the second embodiment, similar functions and advantages to those of the node control unit 250 according to the first embodiment may be achieved.

Although the present technology has been described with reference to the above-described embodiments, the present technology is not limited to the above-described embodiments. Various modifications which are understandable to a person skilled in the art may be made to configurations and details of the present technology within the scope of the invention.

Note that in each of the above-described embodiments, each function of the determination device is implemented by a hardware, such as a circuit. Incidentally, the determination device may include a computer which includes a processing device and a storage device which stores a program (a software) and be configured such that the processing device executes the program to realize each function. In this case, the program may be stored in a computer-readable recording medium. For example, the recording medium is a portable medium, such as a flexible disk, an optical disk, a magnetooptical disk, a semiconductor memory, and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A determination device for a wavelength division multiplex communication system that includes a plurality of transmission devices, each set of adjacent transmission devices being connected by a span, the transmission devices being configured to transmit optical signals of a plurality of wavelengths, each of the optical signals being transmitted via one of a plurality of paths, each of the paths being formed by one or more of the spans, the determination device comprising:
   a processor configured to:
      when an optical signal of a wavelength among the plurality of wavelengths is to be switched from a currently used path to a new path, determine spare paths that can be used as the new path, each of the spare paths including at least one newly used span that is not included in the currently used path,
      for each of the spare paths, determine whether a total number of spans, including the at least one newly used span, forming the spare path is equal to or less than a predetermined upper-limit number of spans,
      when the total number of spans forming the spare path is not equal to or less than the predetermined upper-limit number of spans, perform no further processing for that path, and
      when the total number of spans forming the spare path is equal to or less than the predetermined upper-limit number of spans, determine whether an optical signal of at least one wavelength among the plurality of wavelengths is transmittable through the spare path.

2. The determination device according to claim 1, wherein the processor is further configured to use, as the upper-limit number of spans, a value determined in advance in accordance with a modulation method set in advance for a usable wavelength in the target path.

3. The determination device according to claim 1, wherein the processor is further configured to use, as the upper-limit number of spans, a value determined in advance in accordance with a minimum value of a guard band for spans forming the target path.

4. The determination device according to claim 1, wherein the processor is further configured to use, as the upper-limit number of spans, a minimum value of a value determined in advance in accordance with a type of an optical fiber for spans forming the target path.

5. The determination device according to claim 1, wherein the processor is further configured to:
   detect an occurrence of a failure in each span,
   switch, when the occurrence of the failure is detected, a path formed by the span in which the failure has occurred to a path which bypasses the span in which the failure has occurred, and
   perform the determination immediately after the switching of the path is completed.

6. The determination device according to claim 1, wherein the processor is further configured to:
   inform, when it is determined that none of the optical signals of the plurality of wavelengths is newly transmittable to at least one path, the determination result.

7. The determination device according to claim 1, wherein the processor forms at least a section of one of the transmission devices.

8. A determination method for use in controlling an optical wavelength division multiplex communication system that includes a plurality of transmission devices, each set of adjacent transmission devices being connected by a span, and the transmission devices being configured to transmit optical signals of a plurality of wavelengths, each of the optical signals being transmitted via one of a plurality of paths, each of the paths being formed by one or more of the spans, the method comprising:
   determining, when an optical signal of a wavelength among the plurality of wavelengths is to be switched from a currently used path to a new path, spare paths that can be used as the new path, each of the spare paths including at least one newly used span that is not included in the currently used path,
   for each of the spare paths, determining whether a total number of spans, including the at least one newly used span, forming the spare path is equal to or less than a predetermined upper-limit number of spans,
   when the total number of spans forming the spare path is not equal to or less than the predetermined upper-limit number of spans, performing no further processing for that path, and
   when the total number of spans forming the spare path is equal to or less than the predetermined upper-limit number of spans, determining whether an optical signal of at least one wavelength among the plurality of wavelengths is transmittable through the spare path.

* * * * *